(12) United States Patent
Crowder

(10) Patent No.: US 12,265,491 B2
(45) Date of Patent: *Apr. 1, 2025

(54) SYSTEMS AND METHODS FOR CONFIGURATION OF SEQUENCE HANDLERS

(71) Applicant: Sandpiper CDN, LLC, Wilmington, DE (US)

(72) Inventor: William Crowder, Camarillo, CA (US)

(73) Assignee: Sandpiper CDN, LLC, Wilmington, DE (US)

( * ) Notice: Subject to any disclaimer, the term of this patent is extended or adjusted under 35 U.S.C. 154(b) by 66 days.

This patent is subject to a terminal disclaimer.

(21) Appl. No.: 18/232,675

(22) Filed: Aug. 10, 2023

(65) Prior Publication Data

US 2023/0385212 A1    Nov. 30, 2023

Related U.S. Application Data

(63) Continuation of application No. 17/822,525, filed on Aug. 26, 2022, now Pat. No. 11,726,934.

(60) Provisional application No. 63/241,592, filed on Sep. 8, 2021.

(51) Int. Cl.
| | | |
|---|---|---|
| *G06F 13/20* | (2006.01) | |
| *G06F 9/48* | (2006.01) | |
| *G06F 9/50* | (2006.01) | |
| *G06F 9/54* | (2006.01) | |

(52) U.S. Cl.
CPC .......... *G06F 13/20* (2013.01); *G06F 2213/40* (2013.01)

(58) Field of Classification Search
CPC ...................... G01R 31/318505; G01R 31/311
See application file for complete search history.

(56) References Cited

U.S. PATENT DOCUMENTS

| | | |
|---|---|---|
| 5,838,969 A | 11/1998 | Jacklin |
| 7,817,657 B1 | 10/2010 | Attig |
| 10,394,628 B1 * | 8/2019 | Muraira .................. G06F 9/542 |

(Continued)

OTHER PUBLICATIONS

International Search Report and Written Opinion of the International Searching Authority, dated Nov. 17, 2022, Int'l Appl. No. PCT/US22/075498, Int'l Filing Date Aug. 26, 2022, 13 pgs.

*Primary Examiner* — Getente A Yimer
(74) *Attorney, Agent, or Firm* — C. Tumey Law Group PLLC

(57) ABSTRACT

A method for registering a handler in a configured sequence of handlers includes: receiving, by a processor and memory implementing a sequencer infrastructure, a configuration script defining a sequence including one or more handler identifiers and corresponding one or more handler arguments; invoking a handler initialization entry point for a handler corresponding to a handler identifier, the invoking the handler initialization entry point including: selecting, based on the corresponding one or more handler arguments, a handler type from among two or more of: a configured instance of the handler; a configured alternate handler different from the handler; an alternate sequence of handlers; an expression; and a no-op handler; and initializing a configured handler based on the handler type selected and the corresponding one or more handler arguments; and adding the configured handler to a configured sequence of handlers.

20 Claims, 19 Drawing Sheets

(56) References Cited

U.S. PATENT DOCUMENTS

| | | | |
|---|---|---|---|
| 2005/0183092 A1* | 8/2005 | Christensen | G06F 9/546 |
| | | | 719/313 |
| 2008/0256342 A1* | 10/2008 | Hill | G06F 9/4486 |
| | | | 712/E9.005 |
| 2014/0156682 A1* | 6/2014 | Kolesov | H04M 3/5191 |
| | | | 707/755 |
| 2015/0199710 A1 | 7/2015 | Bell | |
| 2016/0085772 A1 | 3/2016 | Vermeulen | |
| 2019/0081867 A1* | 3/2019 | Lipstone | H04L 67/10 |
| 2020/0242244 A1 | 7/2020 | Hassanshahi | |
| 2023/0073237 A1 | 3/2023 | Crowder | |

* cited by examiner

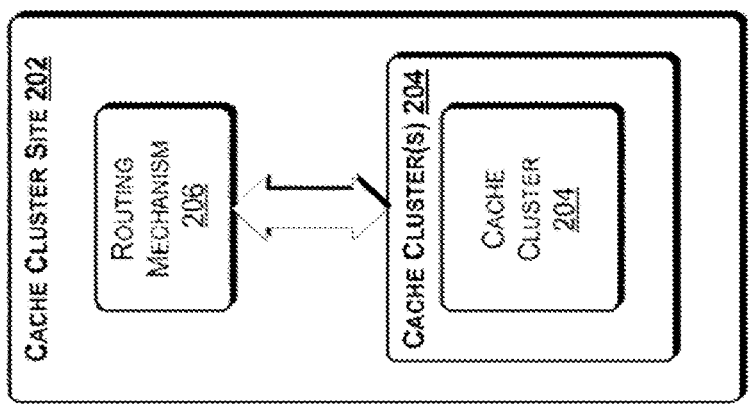
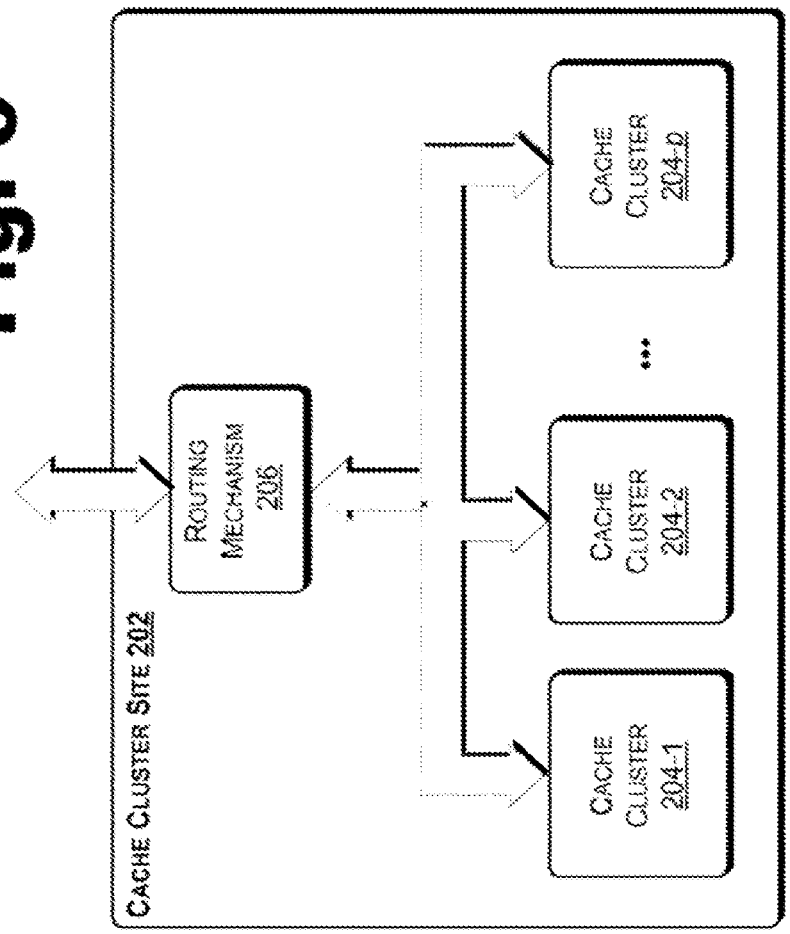

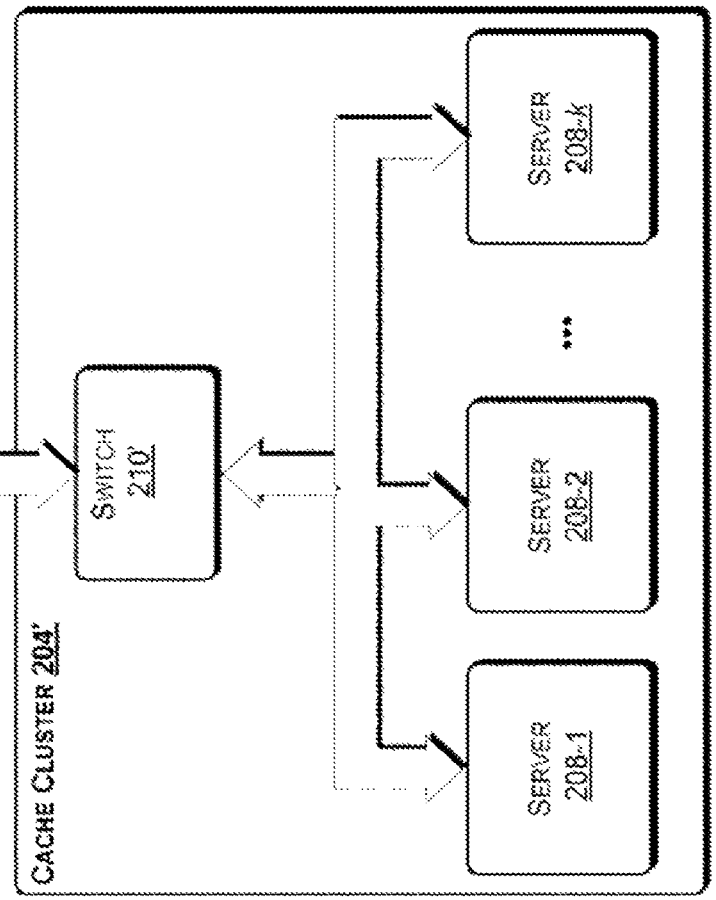
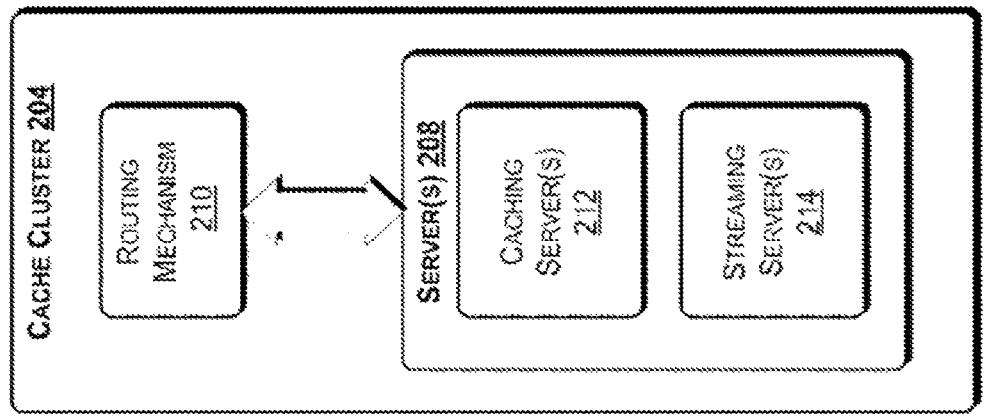

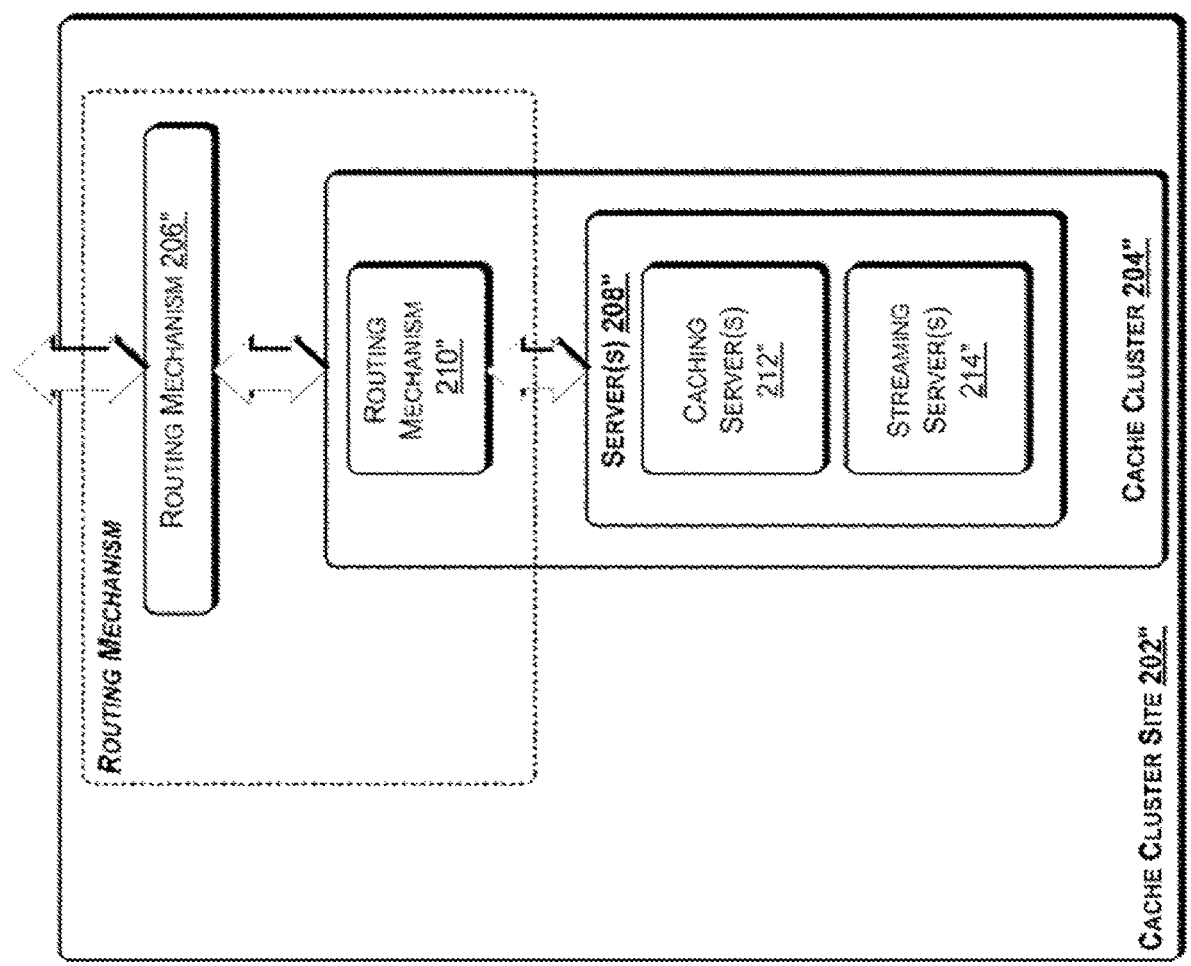

Fig. 10A

1004 NOTES OBJECT

| KEY | VALUE |
|---|---|
| KEY | VALUE |
| ... | ... |
| KEY | VALUE |

Fig. 10B

1006 SESSION OBJECT (SXN)

| KEY | VALUE |
|---|---|
| KEY | VALUE |
| ... | ... |
| KEY | VALUE |

Fig. 10C

1008 TRANSACTION OBJECT (TXN)

| KEY | VALUE |
|---|---|
| KEY | VALUE |
| ... | ... |
| KEY | VALUE |

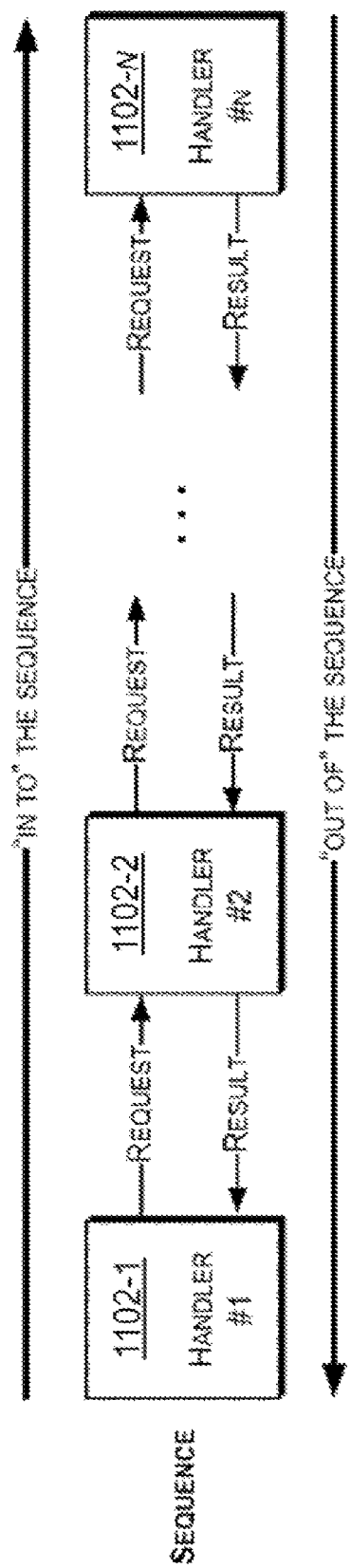

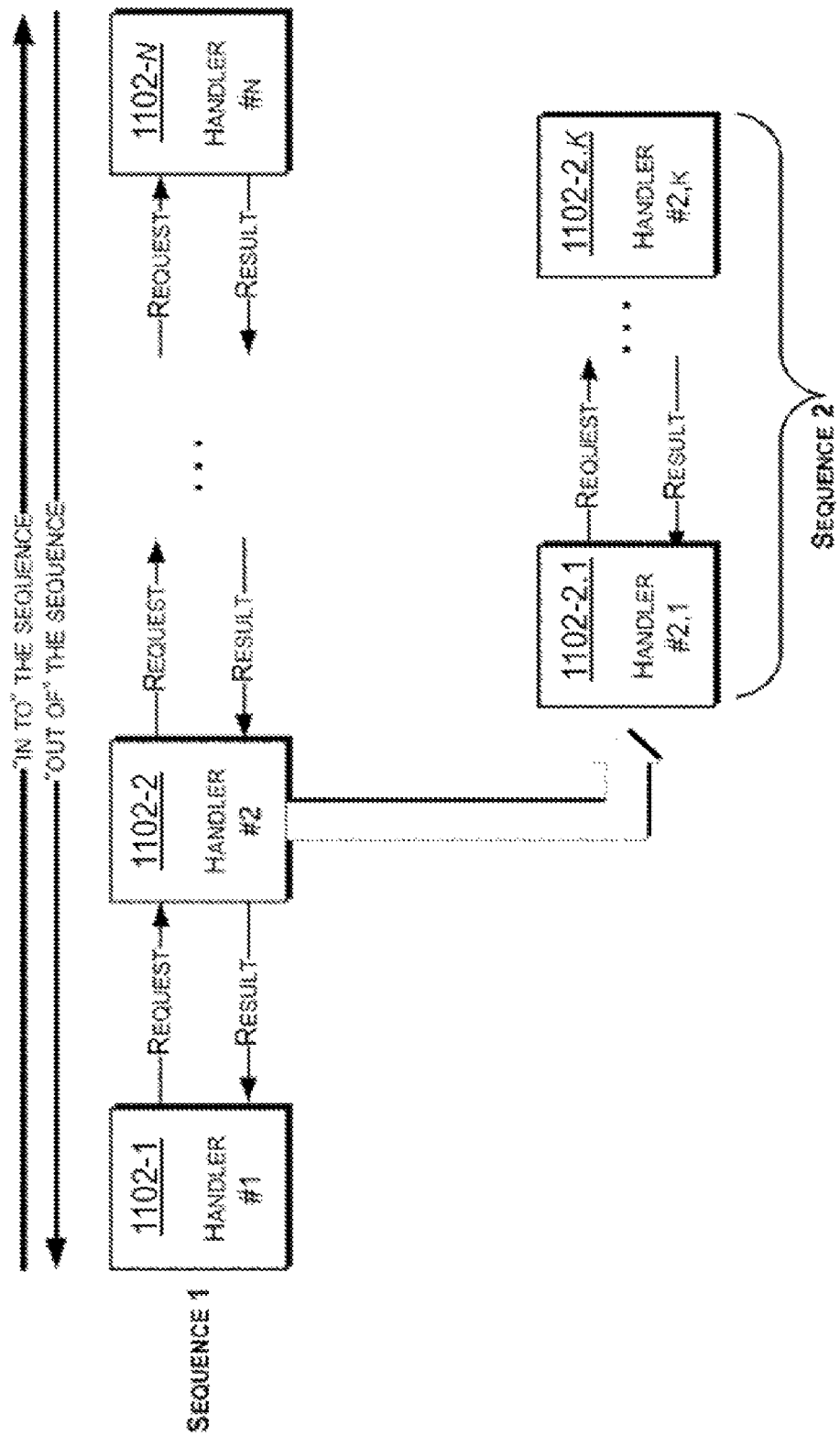

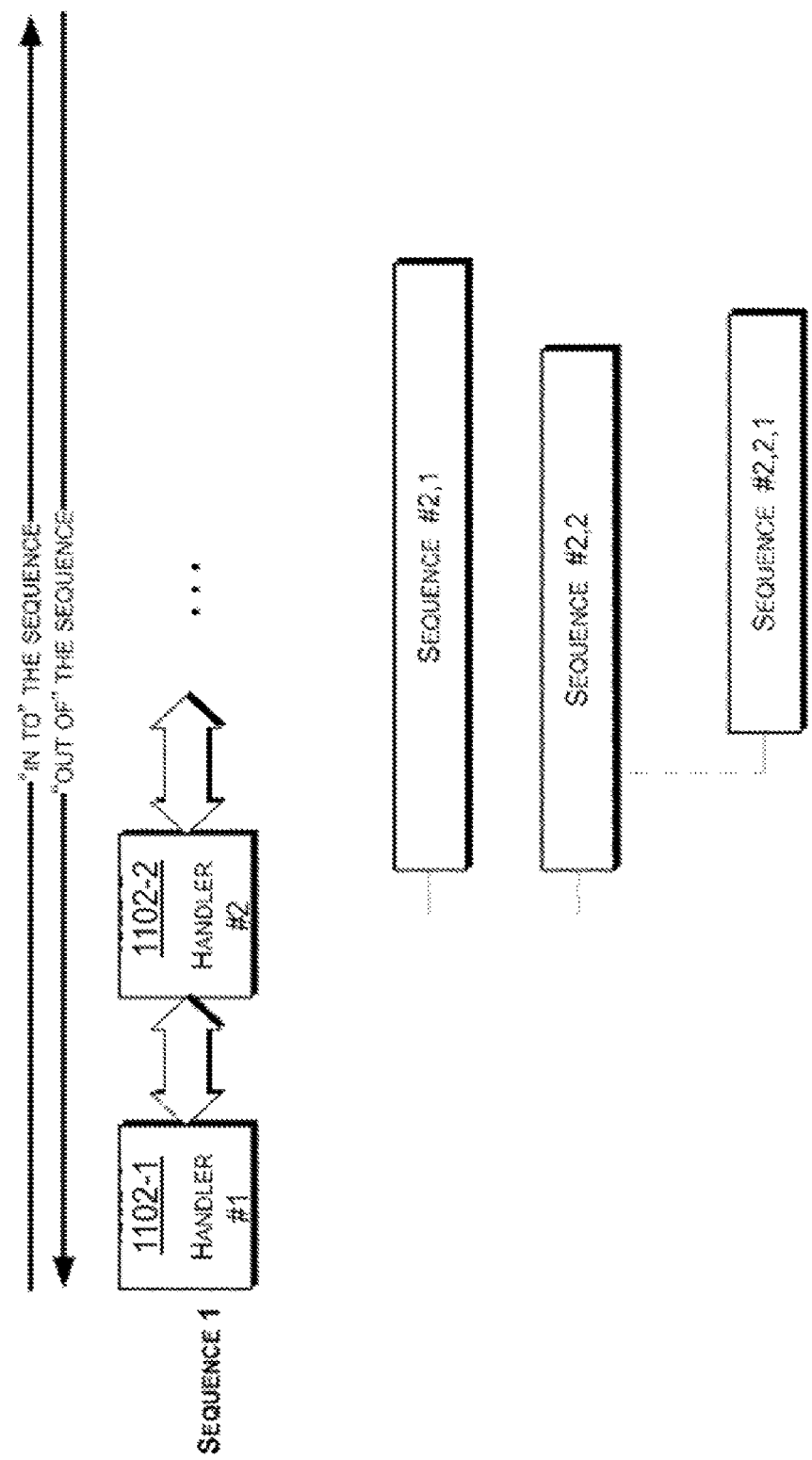

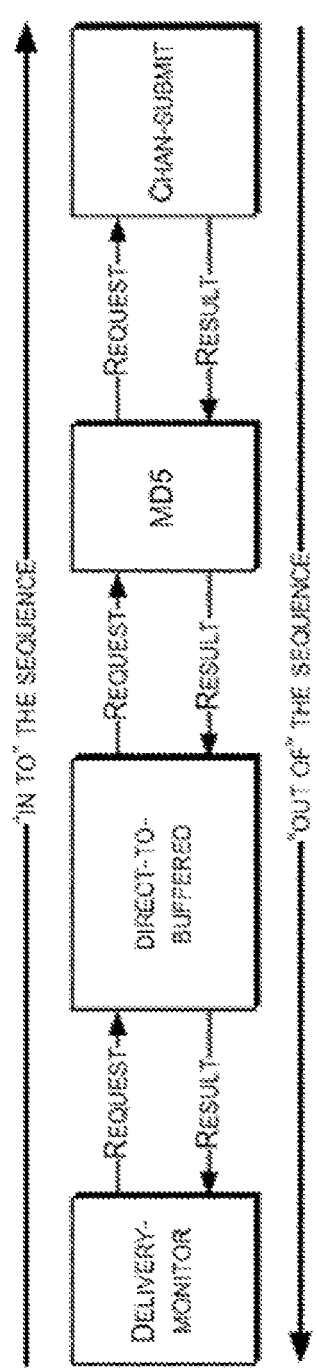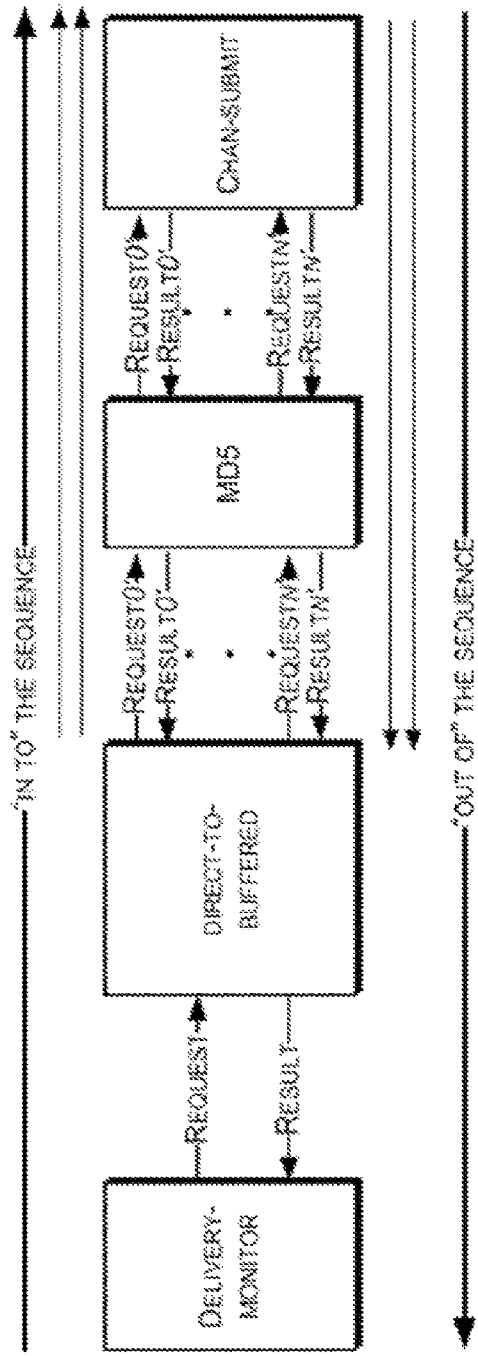

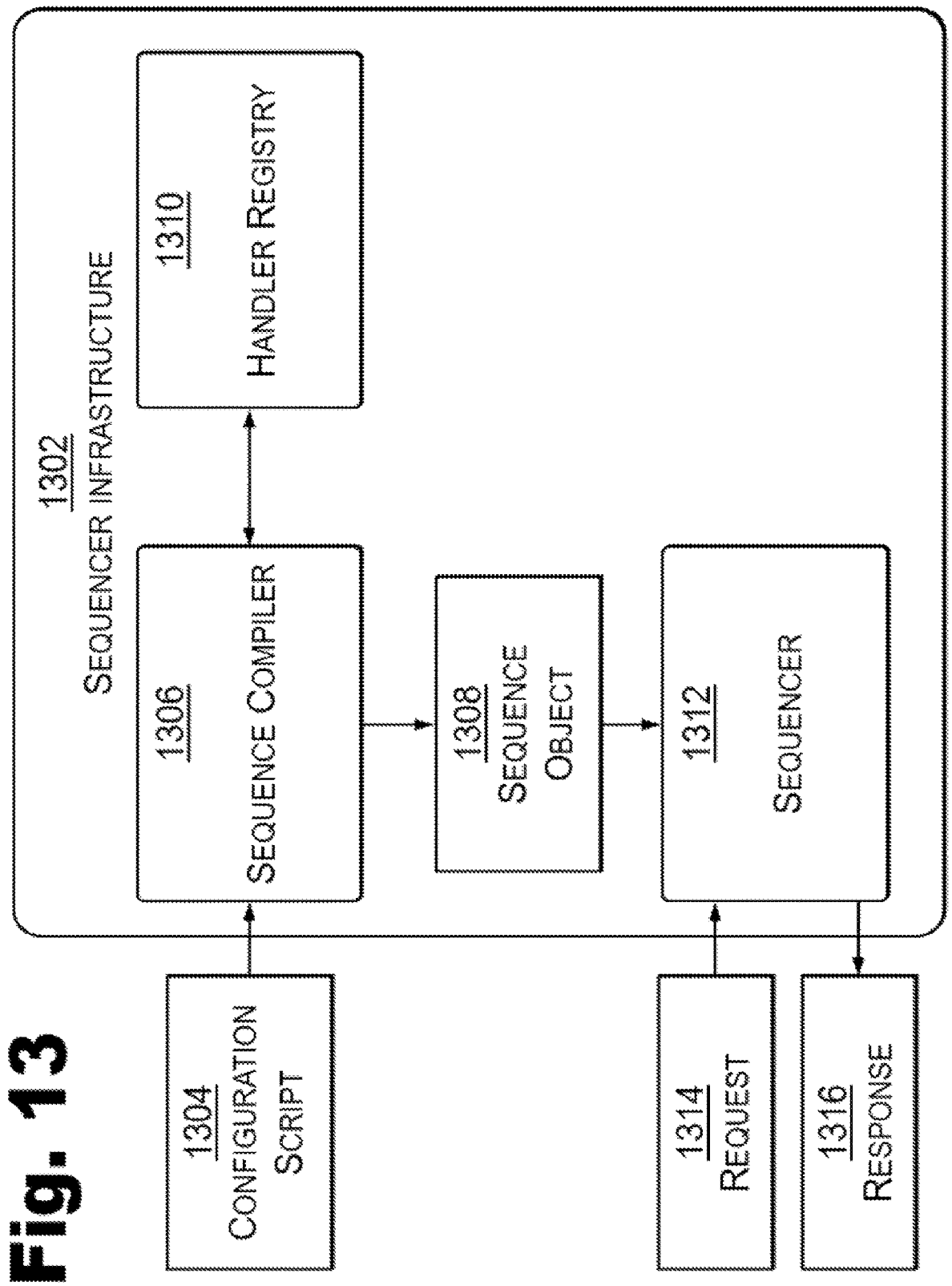

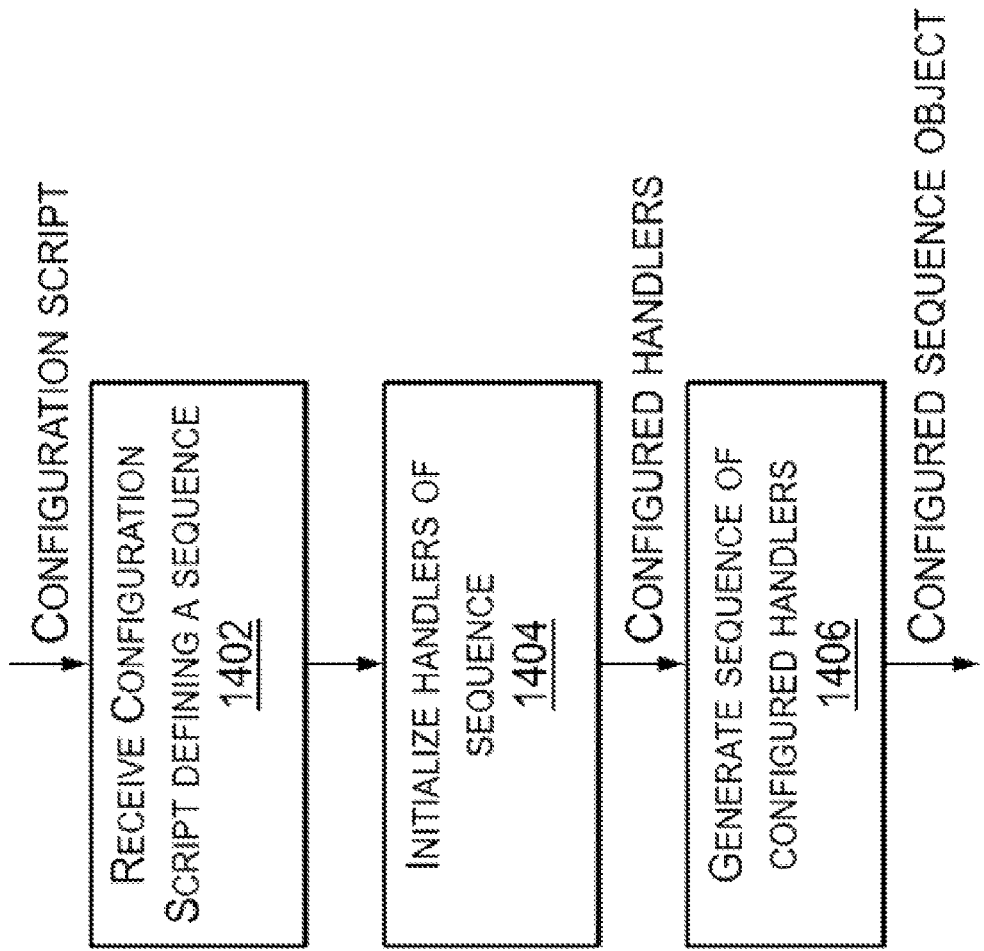

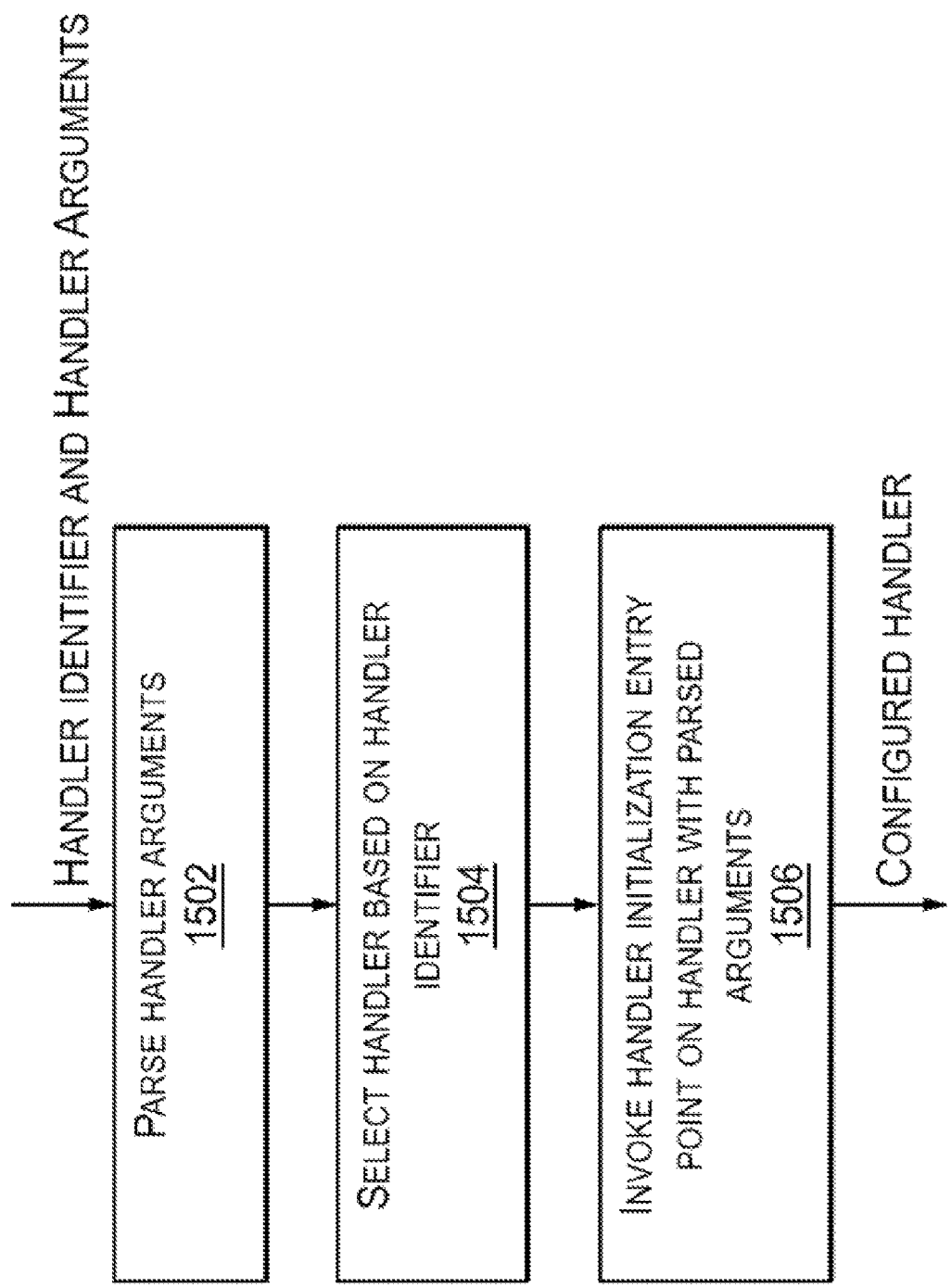

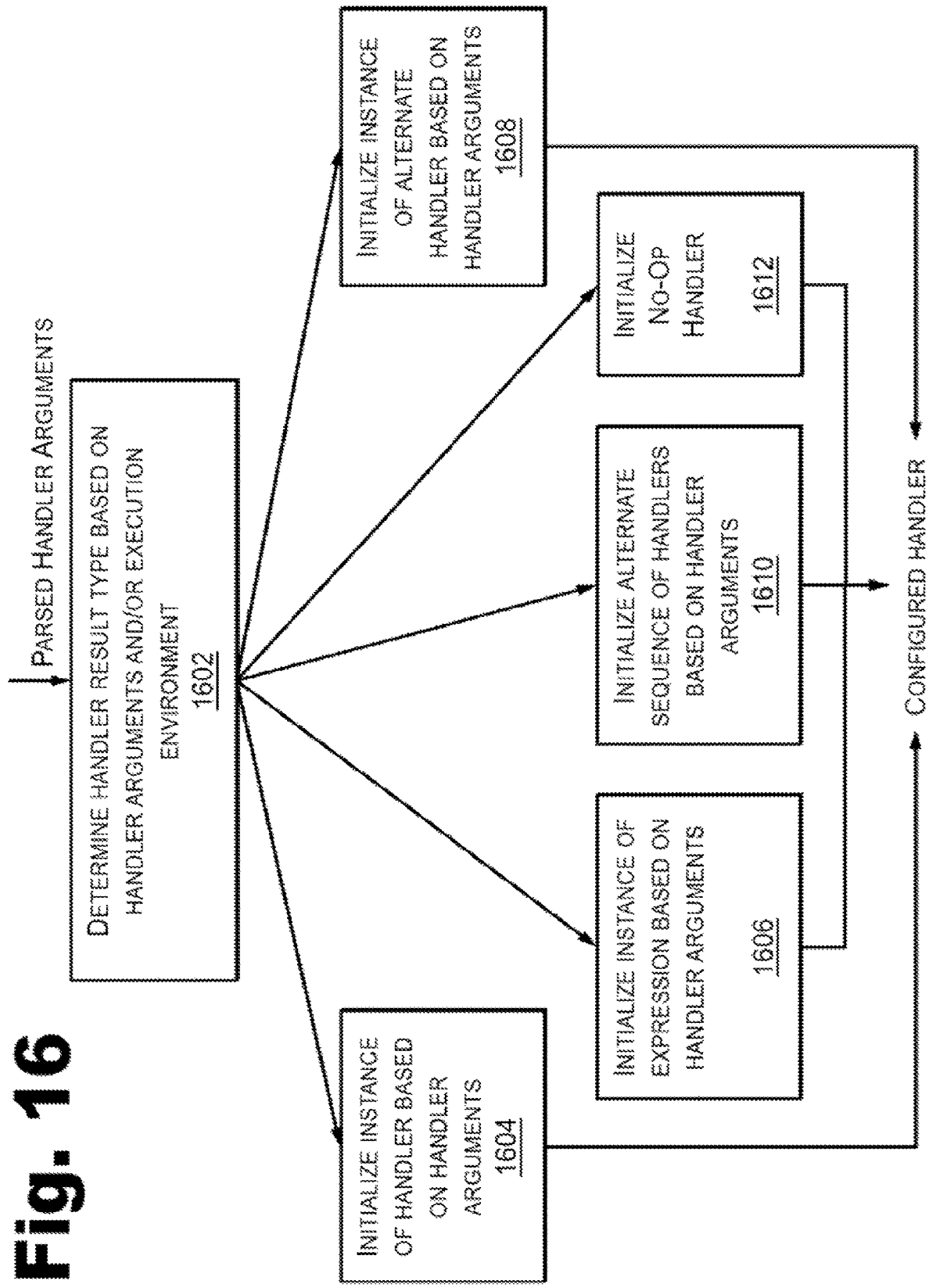

SYSTEMS AND METHODS FOR CONFIGURATION OF SEQUENCE HANDLERS

INCORPORATION BY REFERENCE

The following U.S. patents and published U.S. patent applications are hereby fully incorporated herein by reference for all purposes:

1. U.S. Pat. No. 7,822,871 titled "Configurable Adaptive Global Traffic Control and Management," filed Sep. 30, 2002, issued Oct. 26, 2010;
2. U.S. Pat. No. 7,860,964 titled "Policy-Based Content Delivery Network Selection," filed Oct. 26, 2007, issued Dec. 28, 2010;
3. U.S. Pat. No. 6,185,598 titled "Optimized Network Resource Location," filed Feb. 10, 1998, issued Feb. 6, 2001;
4. U.S. Pat. No. 6,654,807 titled "Internet Content Delivery Network," filed Dec. 6, 2001, issued Nov. 25, 2003;
5. U.S. Pat. No. 7,949,779 titled "Controlling Subscriber Information Rates In A Content Delivery Network," filed Oct. 31, 2007, issued May 24, 2011;
6. U.S. Pat. No. 7,945,693 titled "Controlling Subscriber Information Rates In A Content Delivery Network," filed Oct. 31, 2007, issued May 17, 2011;
7. U.S. Pat. No. 7,054,935 titled "Internet Content Delivery Network," filed Mar. 13, 2002, issued May 30, 2006;
8. U.S. Published Patent Application No. 2009-0254661 titled "Handling Long-Tail Content In A Content Delivery Network (CDN)," filed Mar. 21, 2009;
9. U.S. Published Patent Application No. 2010-0332595 titled "Handling Long-Tail Content In A Content Delivery Network (CDN)," filed Sep. 13, 2010;
10. U.S. Pat. No. 8,015,298 titled "Load-Balancing Cluster," filed Feb. 23, 2009, issued Sep. 6, 2011;
11. U.S. Pat. No. 8,489,750, issued Jul. 16, 2013, published under No. 2010-0332664 titled "Load-Balancing Cluster," filed Sep. 13, 2010; and
12. U.S. Pat. No. 9,516,136, issued Dec. 6, 2016, titled "Customer-Specific Request-Response Processing in a Content Delivery Network," filed on Jun. 12, 2014, which is a continuation of U.S. Pat. No. 9,456,053, titled "Content Delivery Network," issued on Sep. 27, 2016, filed on Dec. 14, 2012.

BACKGROUND

In computing systems, handlers may be configured, such as compilers for generating compiled sequences of handlers for processing information. For example, sequences of handlers may be used in a content delivery network, where the sequences are configured to process incoming requests for data and to process responses generated based on those requests. Nonexclusive examples of sequences of handlers are described in, for example, U.S. Pat. No. 9,516,136, issued Dec. 6, 2016, titled "Customer-Specific Request-Response Processing in a Content Delivery Network" and U.S. Pat. No. 9,456,053, titled "Content Delivery Network," issued on Sep. 27, 2016, filed on Dec. 14, 2012. Although a general environment is discussed, it should be understood that the examples described herein should not be limited to the general environment identified herein.

SUMMARY

Aspects of embodiments of the present disclosure relate to sequences of handlers which may be used, for example, to analyze and generate responses to requests and to process or transform input data.

According to one embodiment of the present disclosure, a method for registering a handler in a configured sequence of handlers includes: receiving, by a processor and memory storing instructions implementing a sequencer infrastructure, a configuration script defining a sequence including one or more handler identifiers and corresponding one or more handler arguments; invoking, by the processor, a handler initialization entry point for a handler corresponding to a handler identifier of the one or more handler identifiers, the invoking the handler initialization entry point including: selecting, based on the corresponding one or more handler arguments, a handler type from among two or more of: a configured instance of the handler; a configured alternate handler different from the handler; an alternate sequence of handlers; an expression; and a no-op handler; and initializing a configured handler based on the handler type selected and the corresponding one or more handler arguments; adding, by the processor, the configured handler to a configured sequence of handlers; and executing, by a sequencer of the sequencer infrastructure, the configured sequence of handlers to generate an output in response to an input.

The selecting of the handler type may further be based on a plurality of parameters of an execution environment of the sequencer.

The parameters of the execution environment may include: a version number of the sequencer infrastructure; a handler registry of handlers available to the sequencer infrastructure; a plurality version numbers of corresponding ones of the handlers of the handler registry; descriptions of hardware capabilities of a server including the processor and memory and configured to execute the sequencer; or a location of the server.

The invoking of the handler initialization entry point may further include dynamically registering the handler with the execution environment.

The handler may be retrieved from a remote source over a network.

The sequencer executing the configured sequence of handlers may process requests and generate responses in a content delivery network.

The sequencer executing the configured sequence of handlers may process requests and generate responses in a web application server.

The sequencer may process input data in a stream processing pipeline corresponding to the configured sequence of handlers.

The method may further include omitting the configured handler from the configured sequence of handlers when the handler type is the no-op handler.

According to one embodiment of the present disclosure, a computing system includes: a processor; and memory storing instructions that, when executed by the processor: register a handler in a configured sequence of handlers by: receiving a configuration script defining a sequence including one or more handler identifiers and corresponding one or more handler arguments; invoking a handler initialization entry point for a handler corresponding to a handler identifier of the one or more handler identifiers, the invoking the handler initialization entry point including: selecting, based on the corresponding one or more handler arguments, a handler type from among two or more of: a configured instance of the handler; a configured alternate handler different from the handler; an alternate sequence of handlers; an expression; and a no-op handler; and initializing a configured handler based on the handler type selected and the corresponding one or more handler arguments; and adding, by the processor, the configured handler to a configured sequence of handlers; and implement a sequencer infrastructure configured to execute the configured sequence of handlers to generate an output in response to an input.

The selecting of the handler type may further be based on a plurality of parameters of an execution environment of the sequencer.

The parameters of the execution environment may include: a version number of the sequencer infrastructure; a handler registry of handlers available to the sequencer infrastructure; a plurality version numbers of corresponding ones of the handlers of the handler registry; descriptions of hardware capabilities of a server including the processor and memory and configured to execute the sequencer; or a location of the server.

The invoking of the handler initialization entry point may further include dynamically registering the handler with the execution environment.

The handler may be retrieved from a remote source over a network.

The sequencer executing the configured sequence of handlers may process requests and generate responses in a content delivery network.

The sequencer executing the configured sequence of handlers may process requests and generate responses in a web application server.

The sequencer may process input data in a stream processing pipeline corresponding to the configured sequence of handlers.

The memory may further store instructions that, when executed by the processor, cause the processor to omit the configured handler from the configured sequence of handlers when the handler type is the no-op handler.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The accompanying drawings, together with the specification, illustrate nonexclusive, exemplary embodiments of the present disclosure.

FIGS. 2 and 3 depict cache cluster sites in a CDN;

FIGS. 4 and 5 depict cache clusters in the cache cluster sites of FIGS. 2 and 3;

FIG. 6 depicts an exemplary cache cluster site;

FIGS. 10A-10C show various data structures;

FIGS. 11B-11D show examples of sequences and sequence processing;

FIG. 12A-12D show examples of sequencers and handlers;

FIG. 13 is a schematic block diagram depicting sequencer infrastructure software running on a server according to one embodiment of the present disclosure;

FIG. 14 is a flowchart depicting a method for initializing a sequence of configured handlers based on an input configuration script according to one embodiment of the present disclosure;

FIG. 15 is a flowchart depicting a method for initializing a handler based on handler arguments according to one embodiment of the present disclosure; and FIG. 16 is a flowchart depicting a method for selecting a type of handler and initializing the selected type of handler based on handler arguments and/or an execution environment according to one embodiment of the present disclosure.

DETAILED DESCRIPTION

Figure 1:
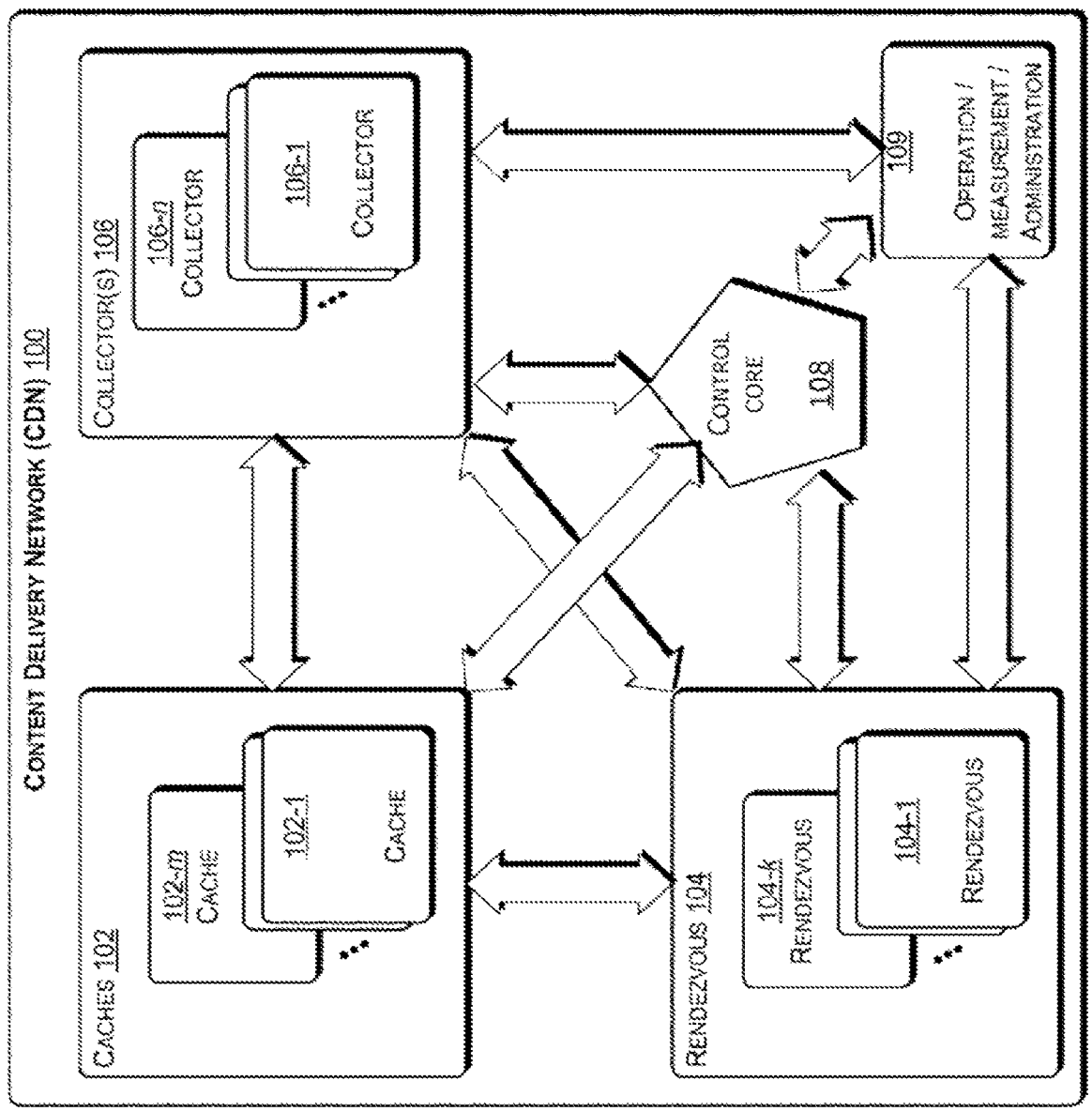
FIG. 1 shows an exemplary content delivery network (CDN)

In the following detailed description, only certain exemplary embodiments of the present invention are shown and described, by way of illustration. As those skilled in the art would recognize, the invention may be embodied in many different forms and should not be construed as being limited to the embodiments set forth herein.

In various data processing and event processing systems, incoming events are processed using a sequence of handlers, where each of the handlers performs a particular operation on the input data to produce some output data (e.g., transformation of the input data), where the output of one handler is provided as input to a next handler in the sequence (or pipeline).

For example, in a content delivery network (CDN,) an incoming event may include an HTTP request for a particular resource or asset (e.g., a web page, a script, an image, a video, or the like). The incoming HTTP request is supplied to a first handler of a sequence of one or more handlers. Various handlers of the sequence may perform different operations on the HTTP request on its way "in to" the sequence, such as decrypting the request, decompressing the request, modifying an encoding of the request, computing values based on metadata of the request and storing the computed values in the request, logging information about the request, updating counts for metrics and/or for billing CDN customers associated with the request, and the like. Handlers may also perform various operations on data generated in response to a request ("response" data) as the response moves "out of" the sequence, such as encrypting the response, compressing the response, storing metrics regarding the size and/or content of the response, and the like. Each handler may conform to particular specifications, which may be set by a designer or programmer as a set of pre-conditions and post-conditions (e.g., as specified by a Hoare triple $\{P\}C\{Q\}$, where P specifies a set of pre-conditions on the input supplied to the handler, C is a command or program transforming the input, and Q is a set of post-conditions on the output produced by the handler). Accordingly, handlers can be composed into a sequence or pipeline of handlers, so long as the output of a given handler of the sequence satisfies the pre-conditions of a next handler in the sequence (e.g., where the range of outputs of the given handler, as specified by its post-conditions, is no larger than the domain of valid inputs to the next handler, as specified by its pre-conditions).

In this light, so long as the handlers are well-behaved (in that they ensure that they operate correctly across the full domain of their pre-conditions and only produce outputs in the range of their post-conditions), individual handlers may be composed to form a sequence of handlers, generally without regard to implementation details of the individual handlers. For example, handlers may perform the transformation of the data (e.g., as implemented by the command C of the Hoare triple) using a single threaded algorithm or a parallel or concurrent algorithm (e.g., multiple copies of the same handler or sequence of handlers operating in parallel or concurrently), may generate side effects (e.g., writing to logs or databases such as in the case of recording metrics associated with the requests or responses), may execute another sequence (e.g., a sub-sequence) of handlers, may trigger concurrent sub-sequences that have different handlers from one another, and the like.

For the sake of illustration, various aspects of embodiments of the present disclosure will be presented herein in the context of use in a CDN, such as in a sequence of handlers that processes received requests and generates responses (e.g., to deliver requested content that is hosted by the CDN). However, embodiments of the present disclosure are not limited thereto and may be applied in other contexts such as "middleware," "servlet filters," or "interceptors" in web application frameworks (e.g., Django, Flask, Java Servlets, ASP.NET, and the like), actors or kernel functions in stream processing frameworks or other software frameworks implementing processing sequences or pipelines of transformations of input data into output data.

As used herein, unless used otherwise, the following terms or abbreviations have the following meanings:
CCS means Customer Configuration Script
CDN means Content Delivery Network;
CNAME means Canonical Name;
DNS means Domain Name System;
FQDN means Fully Qualified Domain Name;
FTP means File Transfer Protocol;
GCO means Global Configuration Object;
HTTP means Hyper Text Transfer Protocol;
HTTPS means HTTP Secure;
IP means Internet Protocol;
IPv4 means Internet Protocol Version 4;
IPv6 means Internet Protocol Version 6;
IP address means an address used in the Internet Protocol, including both IPv4 and IPv6, to identify electronic devices such as servers and the like;
MX means Mail Exchange;
NDC means Network Data Collector;
NS means Name Server;
QoS means quality of service;
TCP means Transmission Control Protocol;
URI means Uniform Resource Identifier;
URL means Uniform Resource Locator; and
VIP address means a virtual IP address.
Context of Content Delivery Network (CDN)

A primary purpose of a content delivery network (CDN) is to distribute resources to client machines on behalf of one or more content providers, such as via a public Internet. A CDN can also provide an over-the-top transport mechanism for sending content in the reverse direction—from the client to the origin server. Both end-users (clients) and content providers benefit from using a CDN. By using a CDN, a content provider is able to take pressure off its own servers. Clients benefit by being able to obtain content with fewer delays.

FIG. 1 shows an exemplary CDN 100, which includes multiple caches 102-1, 102-2 . . . 102-*m* (collectively caches 102, individually cache 102-*i*), rendezvous mechanisms/systems 104-1 . . . 104-*k*, (collectively rendezvous mechanism(s)/system(s) 104, made up of one or more rendezvous mechanisms 104-*j*), collector mechanism/system 106 (made up of one or more collector mechanisms 106-1 . . . 106-*n*), and a control core 108. The CDN 100 also includes various operational and/or administrative mechanisms 109.

As shown in FIG. 2, each CDN cache 102 may be a cache cluster site 202 including one or more cache clusters 204. The cache cluster site 202 may include a routing mechanism 206 acting, inter alia, to provide data to/from the cache clusters 202. The routing mechanism 206 may perform various functions such as, e.g., load balancing, or it may pass data to/from the cache cluster(s) 204. Depending on its configuration, the routing mechanism 206 may pass incoming data to more than one cache cluster 204. FIG. 3 shows an exemplary cache cluster site 202 with p cache clusters (denoted 204-1, 204-2 . . . 204-*p*).

As shown in FIG. 4, a cache cluster 204 includes one or more servers 208. The cache cluster preferably includes a routing mechanism 210, e.g., a switch, acting, inter alia, to provide data to/from the servers 208. The servers 208 in any particular cache cluster 204 may include caching servers 212 and/or streaming servers 214. The routing mechanism 210 provides data (preferably packet data) to the server(s) 208. The routing mechanism 210 may be an Ethernet switch.

The routing mechanism 210 may perform various functions such as, e.g., load balancing, or it may pass data to/from the server(s) 208. Depending on its configuration, the routing mechanism 210 may pass incoming data to more than one server 208. FIG. 5 shows an exemplary cache cluster 204' including k servers (denoted 208-1, 208-2 . . . 208-*k*) and a switch 210'.

The cache cluster site routing mechanism 206 may be integrated with and/or co-located with the cache cluster routing mechanism 210.

FIG. 6 shows an exemplary cache cluster site 202" with a single cache cluster 204" including one or more servers 208". The server(s) 208" may be caching servers 212" and/or streaming servers 214". As shown in the example in FIG. 6, the cache cluster routing mechanism 210" and the cache cluster site's routing mechanism 206" are logically/functionally (and possibly physically) combined into a single mechanism (as shown by the dotted line in the drawing).

In some implementations, some of the cache cluster servers 208 that are connected to a particular switch 210 will share the same virtual IP (VIP) addresses. (Each cache cluster server 208 will also preferably have a different and unique IP address.) In these presently preferred implementations, for the purposes of CDN control, the cache cluster routing mechanism 210 and the cache cluster site's routing mechanism 206 are logically/functionally (e.g., physically) combined into a single mechanism—a switch. In these implementations the cache cluster site refers to all of the machines that are connected to (e.g., plugged in to) the switch. Within that cache cluster site, a cache cluster includes all machines that share the same set of VIPs.

U.S. Pat. No. 8,489,750, titled "Load-Balancing Cluster," filed Sep. 13, 2010, issued Jul. 16, 2013 and U.S. Pat. No. 8,015,298, titled "Load-Balancing Cluster," filed Feb. 23, 2009, issued Sep. 6, 2011, the entire contents of each of which are fully incorporated herein by reference for all purposes, both describe examples of a cache server site (which may be a load-balancing cluster) and an exemplary cache cluster 204.

With reference again to FIG. 1, as explained in greater detail below, the rendezvous system 104 is used to direct client resource requests. The rendezvous system 104 may be implemented using the DNS and may include one or more DNS name servers. In some embodiments, the rendezvous mechanisms 1044 include domain name servers implementing policy-based domain name resolution. An exemplary rendezvous system 104 is described in U.S. Pat. No. 7,822, 871, titled "Configurable Adaptive Global Traffic Control And Management," filed Sep. 30, 2002, issued Oct. 26, 2010, and U.S. Pat. No. 7,860,964 "Policy-Based Content Delivery Network Selection," filed Oct. 26, 2007, issued Dec. 28, 2010, the entire contents of each of which are fully incorporated herein for all purposes.

Figure 7:
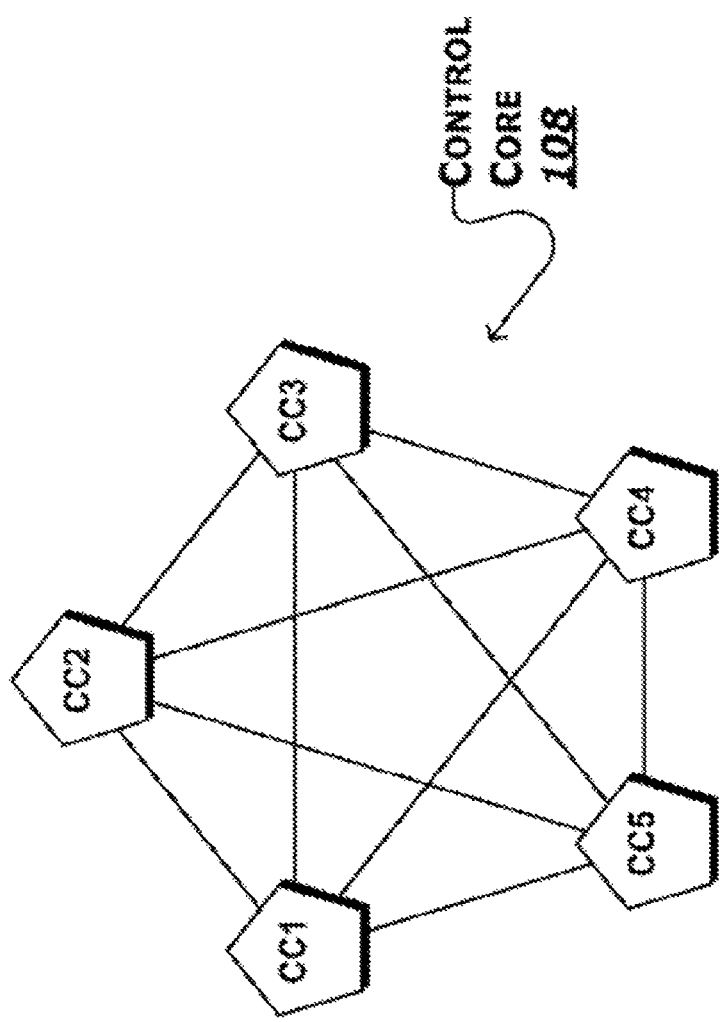
FIG. 7 depicts a control core cluster of a CDN.

The control core mechanism 108 controls operation of the CDN and is described in greater detail below. Physically, the control core preferably consists of a set of geographically distributed machines, preferably connected via high-speed communication links. E.g., five machines located in New York, San Francisco, Chicago, London, and Frankfurt. Logically, the control core acts like a single, robust data base/web server combination, containing configuration data. FIG. 7 shows an exemplary control core mechanism 108 made up of five distinct components or machines (denoted CC1, CC2, CC3, CC4, CC5 in the drawing). While shown with five components or machines, those of skill in the art will realize and understand, upon reading this description, that the control core could be formed of any number of components or machines comprising the control core. Odd numbers are preferable because of the use of voting by the components or machines Larger numbers will make the control core more available but respond slower. Having only one machine is a degenerate case possibly useful in non-production situations. The components or machines forming the control core are operated together as a single high-availability cluster, and are shown as a single entity in most drawings. It should be understood that any particular interaction with the control core mechanism 108 will likely take place with only one of its component machines. The control core mechanism 108 is also referred to herein as the control core cluster 108 or the control core 108.

Although only one control core 108 is shown in FIG. 1, it should be appreciated that a CDN may have more than one control core, with different control cores controlling different aspects or parts of the CDN.

The control core 108 is addressable by one or more domain names. For the sake of this description, the domain name control.fp.net will be used for the control core 108. In a preferred implementation the control core cluster consists of five (5) distinct and geographically distributed control core mechanisms and is operated as a multihomed location with five (5) IP addresses. Thus, when a client asks a DNS server to resolve the control core's domain name (e.g., control.fp.net) the DNS server will return one or more of the five IP addresses associated with that name. That client may then access the control core at one of those addresses. It should be appreciated that the DNS server(s) will provide the client with a rendezvous to a "nearby" control core server or servers (i.e., to "best" or "optimal" control core server(s) for that client), similar to the manner in which clients rendezvous with CDN servers. In other words, internal components of the CDN (cache servers, control cores, etc.) may use the same rendezvous mechanisms as are used by entities outside the CDN to rendezvous with CDN components. In some cases, the various control core mechanisms may have the same IP address, in which cases routing tables may direct a client to a "best" or "optimal" control core mechanism. This may also be achieved using an anycast IP address.

A CDN may have one or more tiers of caches, organized hierarchically. Tiers of caches are described in more detail, for example, in U.S. Pat. No. 9,516,136, titled "Customer-Specific Request-Response Processing in a Content Delivery Network," filed on Jun. 12, 2014 and issued Dec. 6, 2016, the entire content of which is fully incorporated herein for all purposes.

Figure 8:
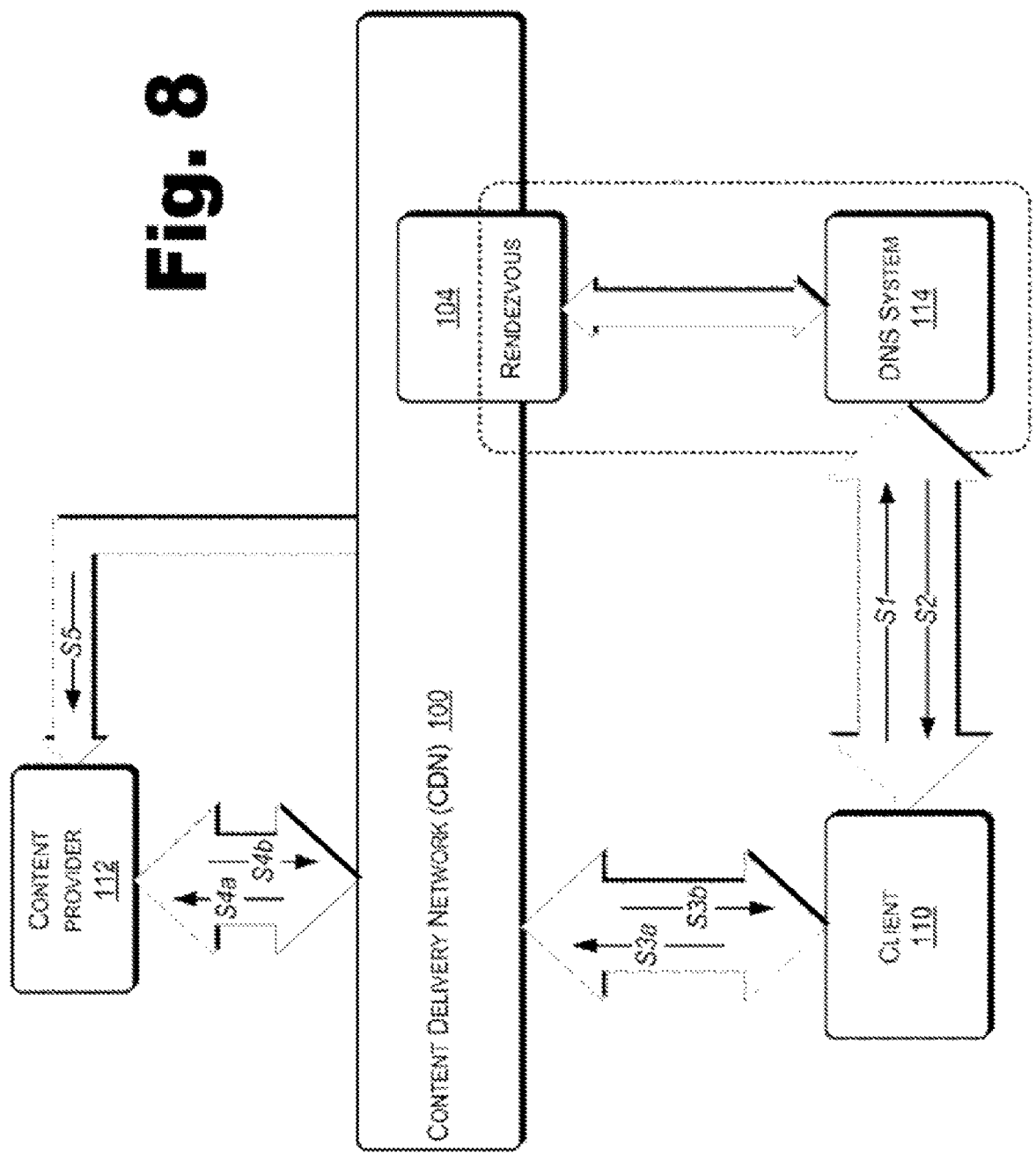
FIG. 8 shows a typical interaction between a client and a CDN.

FIG. 8 shows a typical interaction between a client 110 and a CDN 100. In this case the CDN 100 serves content (resources) on behalf of the content provider 112. As described above, the CDN includes multiple locations (e.g., cache sites not shown in the drawing) from which content may be provided/served to clients. The process of associating a particular client (or client request) with a particular location in the CDN is referred to as a rendezvous process. When a particular client (e.g., client 110) wants to obtain some content (e.g., a particular resource), that client is typically directed to a "best" (or "optimal") location (via some rendezvous mechanism 104). As used here, a location may be, e.g., a server, a server site, a region of servers, a cache cluster, a cache cluster site, etc. The location may even be another CDN or network or a server outside the CDN 100. With reference to FIG. 1-7, the "best" or "optimal" location may be, without limitation, a cache cluster site, a cache cluster, a group, a tier, or some combination thereof.

Those of skill in the art will realize and understand, upon reading this description, that the notion of a "best" or "optimal" location is dependent on multiple factors, including, without limitation, some or all of the following: network load, load on the CDN servers and other components, location of the client computer, etc. The notion of a "best" or "optimal" location may vary by time of day, type of content, content provider policies, CDN policies, etc. The invention is not to be limited in any way by the manner in which a "best" or "optimal" location in the CDN is determined.

In some implementations, the rendezvous system 104 uses, and is integrated into, the DNS system as described in U.S. Pat. No. 7,822,871, filed Sep. 30, 2002, issued Oct. 26, 2010, and U.S. Pat. No. 7,860,964, filed Oct. 26, 2007, issued Dec. 28, 2010, the entire contents of each of which are fully incorporated herein for all purposes. The client 110's DNS system 114 interacts with the CDN's rendezvous mechanism 104 in order to associate a particular client request for a resource with a particular location, preferably in the CDN 100, from which that requested resource will be served to the client. The "best" or "optimal" location may be provided by the rendezvous mechanism 104 as one or more IP addresses or a CNAME (domain name) corresponding to one or more locations in the CDN or to a different CDN or network.

With reference to FIG. 8, an exemplary use of the CDN 100 (in which the client 110 wants to obtain a particular resource) is as follows:

The client computer 110 interacts with the rendezvous mechanism 104 in order to determine the "best" location from which to obtain the particular resource (at S1). When the rendezvous mechanism 104 is integrated into the DNS system, the client's DNS system 114 interacts with the CDN's rendezvous mechanism 104 to direct the client to a location, such as in the CDN 100, from which the client can obtain (or try to obtain) the resource. When the rendezvous mechanism 104 is integrated into the DNS system, this request (at S1) may be part of a request to resolve a domain name associated with the particular resource, and the rendezvous mechanism may provide the client with one or more IP addresses or CNAME of one or more locations in the CDN (at S2). If the rendezvous mechanism provides more than one IP address (corresponding to more than one "best" location), the client may select which of those addresses to use.

Having obtained a "best" location from which to obtain the particular resource, the client computer 110 then requests the particular resource from the location in the CDN 100 (at S3a). The CDN 100 may already have a copy of that particular resource at that location, in which case it provides (serves) the resource to the client computer 110 (at S3b). If the CDN did not already have a copy of that particular resource at that location, then it tries to obtain a copy at that location (either from another location in the CDN or from the content provider 112 (at S4a, S4b)). Having obtained the resource (either from another location in the CDN or from the content provider 112), the CDN 100 provides (serves) the resource to the client computer 110 (at S3b). It should be appreciated that in some cases the response could be generated within the CDN 100 as opposed to being fetched. This may occur, e.g., in the case of a conversion from an existing resource (such as a compression/transcoding) or completely generated by a script/process (either previously pulled from the content providers origin server, or provided from the control core as part of the property configuration).

The CDN may also provide information (e.g., logs and performance data) to content providers regarding resources delivered on their behalf. Thus, as shown in FIG. 8, the CDN 100 may provide information to the content provider 112 (at S5).

To simplify the above explanation, FIG. 8 shows only one client computer 110, one content provider 110 and one CDN 100. Those of skill in the art will realize and understand, upon reading this description, that a typical CDN may provide content on behalf of multiple content providers to multiple client computers. Those of skill in the art will also realize and understand, upon reading this description, that the system may include multiple CDNs, and that the rendezvous mechanism 104 may cause client requests to be directed to different ones of the CDNs. An exemplary rendezvous mechanism 104 is described, e.g., in U.S. Pat. Nos. 7,822,871 and 7,860,964, the entire contents of each of which are fully incorporated herein by reference for all purposes.

As used herein, the terms "resource" and "content" refer, without any limitations, to any and all kinds of resources and/or content that may be provided to client computers via CDNs. Resources and/or content may be any static or dynamic data item comprising an arbitrary sequence of bits, regardless of how those bits are stored or transmitted, and regardless of what those bits represent. A resource provided by a CDN may comprise data representing some or all of another resource, including some or all of: a file, a portion of a file, a digital message, a portion of a digital message, a digital image, a portion of a digital image, a video signal, a portion of a video signal, an audio signal, a portion of an audio signal, a software product, a portion of a software product, a page in memory, a web page; a movie, and a portion of a movie. This list is given by way of example, and is not intended to be in any way limiting.

FIG. 8 shows the client 110 as separate from the CDN 100. As will be explained in more detail below, the various components of the CDN may themselves act as clients with respect to the CDN in order to obtain CDN related resources. Therefore, the client may be a CDN element or component, e.g., a cache. Similarly, FIG. 8 shows the content provider 112 as separate from the CDN 100. As will be explained in more detail below, the various components of the CDN could themselves act as content providers with respect to the CDN in order to provide CDN related resources to other CDN components. Thus, as will be explained further below with reference to FIG. 1, when a collector mechanism 106 obtains information from a cache 102, that collector mechanism 106 is acting as a client, while the cache 102 is a content provider.

The CDN has been described thus far in terms of its separate and distinct components. It should be understood, however, that within the CDN each object (e.g., all data that is to be moved between CDN components) is treated as a web object or resource, with, e.g. the control core acting as the "origin tier" for such objects. That is, each CDN object has a URL (or whatever address is used by the CDN), and each CDN object can be requested, filled, invalidated, refreshed, etc. Each cache has the knowledge (information) it needs to obtain and provide CDN objects. This approach allows all data transfers within the CDN to use the CDN itself. The CDN can thus use its own mechanisms to deal with CDN control and/or management-related information (e.g., control core data). Thus, e.g., any CDN component can obtain CDN data using the CDN.

Request-Response Processing

In operation, the various CDN components (e.g., caches) receive requests for resources, processes those requests, and provide responses (which may include, e.g., the requested resources, error messages, or directions to find the resources elsewhere).

Figure 9:
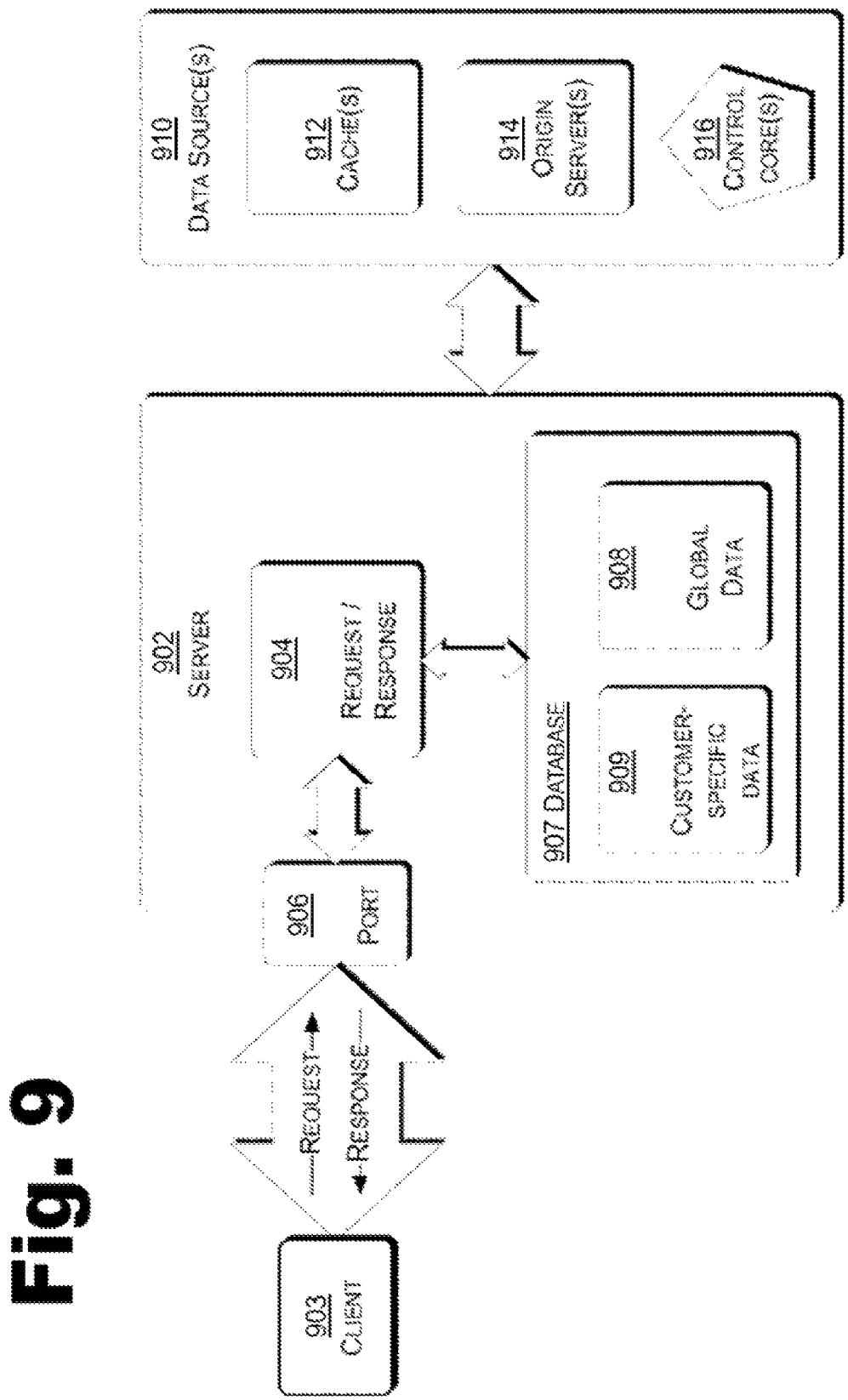
FIG. 9 shows request-response processing in a CDN.

FIG. 9 shows the request-response operation of an exemplary CDN component 902. Although component 902 is denoted "Server" in the drawing, it should be appreciated that component 902 may be a cache server or any other component of the CDN that performs request-response processing. As shown in the drawing, client 903 makes a request for a resource of server 902, and receives a response to that request. In processing that request, as explained below, the server 902 may obtain information from one or more other data sources 910. Some of these data sources 910 may be other CDN components (e.g., caches 912 or control core(s) 916). The data sources 910 may also include origin server(s) 914 that may or may not be part of the CDN. It should be appreciated that the client 903 may be another CDN component (e.g., a cache) or it may be a client entity that is external to the CDN.

The server 902 preferably supports HTTP/1.0, and HTTP/1.1, HTTP/2, HTTP/3 (QUIC), and HTTPS requests, although it is not limited to those protocols or to any particular version of any protocol. HTTP/1.1, for example, was defined in Network Working Group, Request for Comments (RFC): 2616, June 1999, "Hypertext Transfer Protocol—HTTP/1.1," and has been updated by a series of additional RFCs, including at least RFCs 7230, 8615, 9110, and 9112, among others, the entire contents of which are fully incorporated herein by reference for all purposes. HTTPS is described in Network Working Group, Request for Comments: 2818, May 2000, "HTTP Over TLS," and has been updated by a series of additional RFCs, including at least RFCs 5785, 7230, 9110, among others, the entire contents of each of which are fully incorporated herein by reference for all purposes. Unless specifically stated otherwise, "HTTP" is used in this description to refer to any version or form of HTTP request, including HTTP and HTTPS requests. Those of skill in the art will realize and understand, upon reading this description, that HTTPS may be used in situations where additional security may be desired or required. It should also be appreciated that when an HTTP request is referred to herein, some other protocols, including possibly proprietary protocols, may be used while still leveraging the CDN and using URLs to name the objects.

The server 902 includes a request/response mechanism 904 (e.g., implemented by software in combination with hardware on the server 902). The request/response mechanism 904 listens for requests on multiple configured addresses/ports, including port 906.

When a request is made, the request/response mechanism 904 tries to identify a customer associated with that request. As used here, a "customer" is an entity that is authorized to have its content served by the server 902. The customer may be an external entity such as, e.g., a subscriber to the CDN, or the customer may be another CDN component. In order to determine whether or not the request is associated with a customer of the CDN (or the CDN itself), the server 902 needs at least some information about the CDN's customers. This information may be stored as global data 908 in a database 907 on the server 902. The global data 908 should include sufficient data to allow the server 902 to either reject the request (in the case of a request for a resource that is not associated with a customer), or to serve the requested resource to the client 903, or to direct the client to another source from which the requested resource can be served. If the server 902 does not have the required global data 908 at the time of the client request, it may obtain the needed global data 908 from a data source 910, preferably from a control core 916 or from another cache. In effect, for internal CDN data, the control core is considered an origin server or co-server.

As explained below, the request/response mechanism 904 may perform customer-specific processing as part of the request/response processing. In order to perform customer-specific processing, the request/response mechanism needs certain customer-specific data 909. If current customer-specific data 909 are not available in the request/response mechanism's database 907, the server 902 may obtain the needed customer-specific data from a data source 911, preferably from a control core 916 (although customer-specific data may also be obtained from another cache 912 in the CDN).

Sequencers and Handlers

In some embodiments, processing performed by request/response mechanism 904 uses various kinds of objects, including a Notes Object, a Session Object (sxn), and a Transaction Object (txn). With reference to FIG. 10A, a Notes Object 1004 is a generalized string key/value table. FIGS. 10B-10C show a Session Object (sxn 1006) and a Transaction Object (txn 1008), respectively. A session object 1006 contains information about a particular client session, e.g., a client connection or an internally launched (or spawned) session. A Session Object 1006 may contain allocation context information for a session. A Transaction Object (txn 1008) is usually associated with a session and contains information about an individual request. During a session, multiple transactions may be performed, and information about each transaction is carried in a transaction object. E.g., a transaction object carries the request to be satisfied, room for the response, information about where the response body is coming from (e.g., response channel id), etc.

Figure 11A:
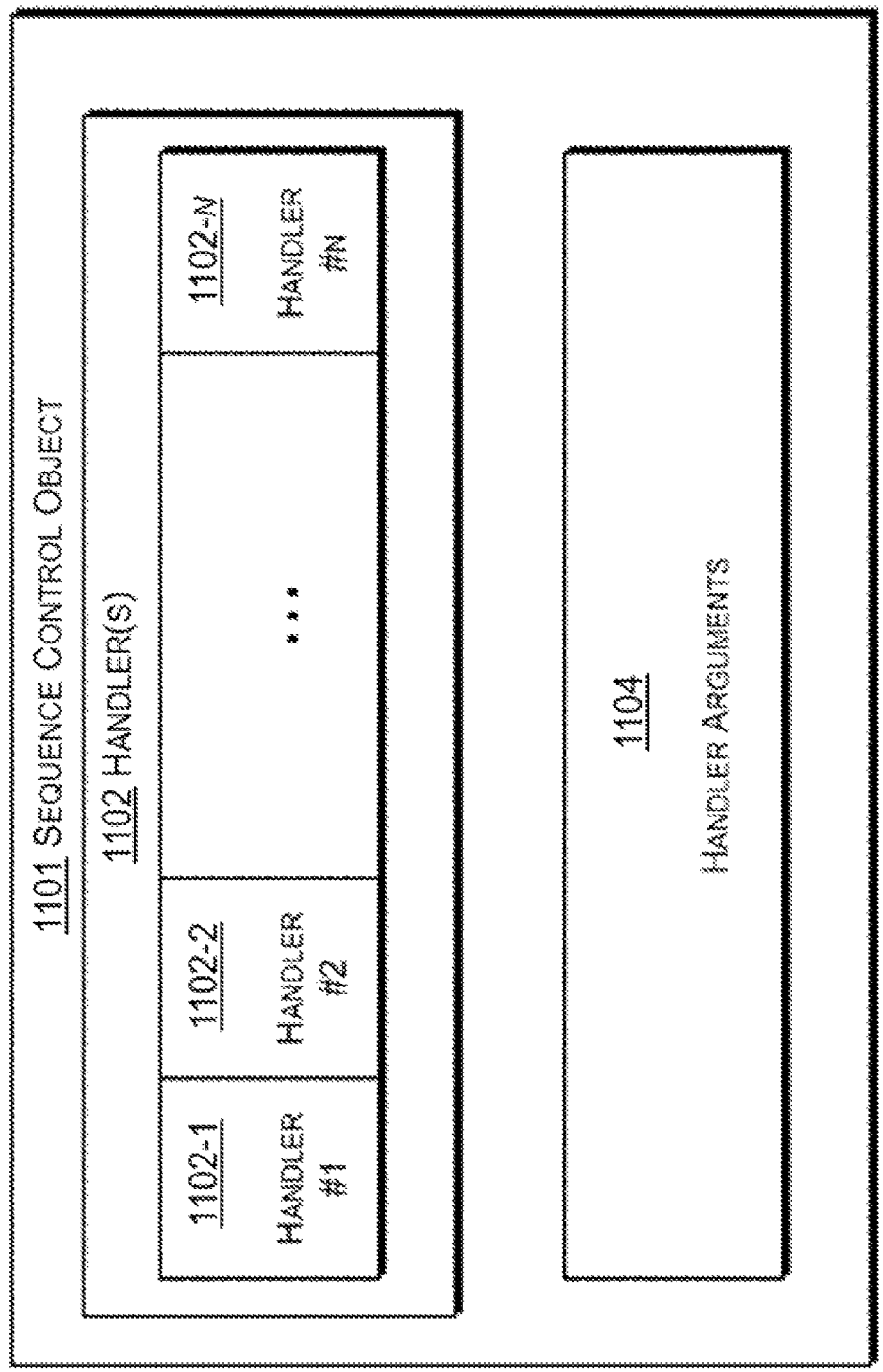
FIG. 11A is a logical depiction of a sequence object.

A sequencer (or "task") uses a sequence object made up of an ordered list of one or more handlers and handler argument(s). FIG. 11A shows an exemplary sequence object 1101 including handler(s) 1102 and handler argument(s) 1104. The handler(s) 1102 include the ordered lists of handlers 1102-1, 1102-2 . . . 1102-*n*. It should be appreciated that not all handlers require arguments, and that some handlers may obtain some or all of their arguments from other locations. It should also be appreciated that a sequence object may have only a single handler and/or no arguments.

When running, a sequencer invokes its handlers (essentially, processing modules) in order. In some embodiments, sequencers are bidirectional, so that the sequencer's handlers are called (invoked) in order on the way "in" (e.g., when processing a request) and in reverse order on the way "out" (e.g., when generating a response). Handlers can modify the sequence, thereby providing additional flexibility. FIG. 11B shows the execution of the sequence of handlers 1102 from sequence object 1101 (of FIG. 11D). As shown in FIG. 11B, the sequencer invokes the handlers in the order "Handler #1," "Handler #2," . . . "Handler #n" into the sequence and then in the reverse order out of the sequence. So "Handler #1" makes a request of "Handler #2", and so on, until "Handler #n", and then results are passed back, eventually from "Handler #2" to "Handler #1".

Handlers may be synchronous or blocking. In examples, handlers may cause the processing of a request to stall while resources needed to service it, e.g., data from network or disk, are obtained. However, in the architecture of some examples, handlers do not perform traditional "blocking" operations because the thread in which they are running is used to service multiple simultaneous requests using an event loop mechanism. Handlers may inspect and modify the sequence to which they belong, and handlers may launch their own sequencers. There are two forms of this process: one is where a handler launches a "subsequence". That subsequence runs in the same sequencer as the handler and the sequence the handler is in is suspended until the subsequence is complete. Another example is where a handler launches a complete sequencer. In that case, the sequencer is a separate, independent task. A powerful aspect of that model is that a handler could launch such a sequence on the way into the sequence, allow processing to continue, and then pick up the result (waiting if necessary) on the way out of the sequence. FIG. 11C shows an example of a first sequence ("Sequence 1") in which a handler (Handler #2, 1102-2) launches (or spawns) another sequence ("Sequence 2", consisting of Handler #2,1 1102-2.1 . . . Handler #2,k 1102-2.*k*). If Sequence 2 runs in the same sequence as the handler #2, then handler #3 (of sequence 1) will not begin until sequence 2 is complete (i.e., until handler #2,k is done). If, on the other hand, sequence 2 is launched as an independent and separate task, sequence 1 can continue with handler #3, etc. without waiting for sequence 2 to complete.

FIG. 11D shows an example of a first sequence ("Sequence 1") in which a handler (#2) launches two other sequences (Sequence #2,1, and Sequence #2,2). The Sequence #2,2 launches a subsequence #2,2.1.

In some embodiments, a handler's behavior may be classified into three broad groups (or types):
One-shot: The handler is removed from sequence when done.
Intelligent: The handler may manipulate sequence.
Persistent: The handler is called on the way "in" and "out".

These labels are used as descriptive shorthand for basic types of handler behavior, and it should be appreciated that this type is not used by the sequencer, and nothing needs to enforce a handler's "type," and a handler may act differently depending on circumstances (e.g., a handler may have behavior different from the three broad types listed above).

Handlers may be named (e.g.: "ssl", "http-conn", "http-session", "strip-query", "proxy-auth", etc.) to correspond to the functions that they are to perform.

A sequence object may be stored in compiled form for re-use, so there is no need to constantly look up handler names.

The following is an example of a sequence specification for an HTTP listener:

```
listener = {
    address = "*: 80",
    sequence = "http-conn, http-session"
}
```

In this example, the handlers are "http-conn" and "http-session", and the parameters are "address='*0:80'". This listener task provides a bare TCP or cleartext connection. The first handler ("http-conn") is a one-shot handler which creates an HTTP connection from a cleartext connection. The second handler ("http-session") is an intelligent handler that takes the HTTP connection (as already created by the "http-conn" handler), creates a session object and handles the entire session. It should be appreciated that the listener is providing the communication channel to the client, and the same basic listener code could be used with different handlers to implement protocols other than HTTP (e.g., FTP).

As another example, the following sequence specifies a general SSL listener:

```
listener = {
    address = "*: 443",
    sequence = "ssl, http-conn, http-session"
}
```

In this example, the handlers are "ssl", "http-conn" and "http-session", and the parameters are "address='*0:443'". This sequence is similar to the HTTP listener (above), except that the SSL handler first creates an SSL channel on the bare (encrypted) connection, suitable for the http-conn handler. Although the SSL handler is a "one-shot" handler, it needs to block since it must perform the SSL negotiation. That is, the "ssl" handler must complete before the next handler can begin. The SSL handler is responsible for instantiating an SSL channel. It should be appreciated that although the ssl channel is persistent, the handler that sets it up does not need to be persistent. The "ssl" handler instantiates an SSL channel on top of the cleartext channel. Once that is done, the SSL channel (which does the decryption and encryption) persists until the connection is finished, even though the "ssl" handler itself is gone from the sequence. So the "ssl" handler is not performing the SSL operations itself, it is just enabling them by instantiating the necessary channel.

FIGS. 12A-12D show examples of sequencers and handlers.

Figure 12A:
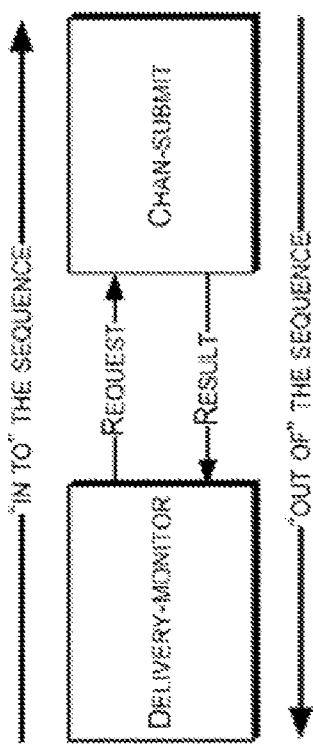

As shown above, a sequence may be used to interpret a request from a client and to generate a response to be returned to the client. (The same basic sequencing mechanism can be used to implement a programmable filter, although the handlers may be performing a different task than described above.) FIG. 12A shows a bidirectional sequence that is part of a request/response mechanism 904. In this example, the sequence uses "direct delivery" requests, e.g., sendfile( ), because it does not need to see or process the underlying data. It should be appreciated that sendfile( ) is not the request, but rather one way a direct delivery request may be implemented by the channel involved. The delivery sequence shown in FIG. 12A includes two handlers:

delivery-monitor (account bytes, monitors performance); and chan-submit (submits request to a channel, waits for response). The channel may be, e.g., an object channel, downstream channel, etc.

Figure 12B:
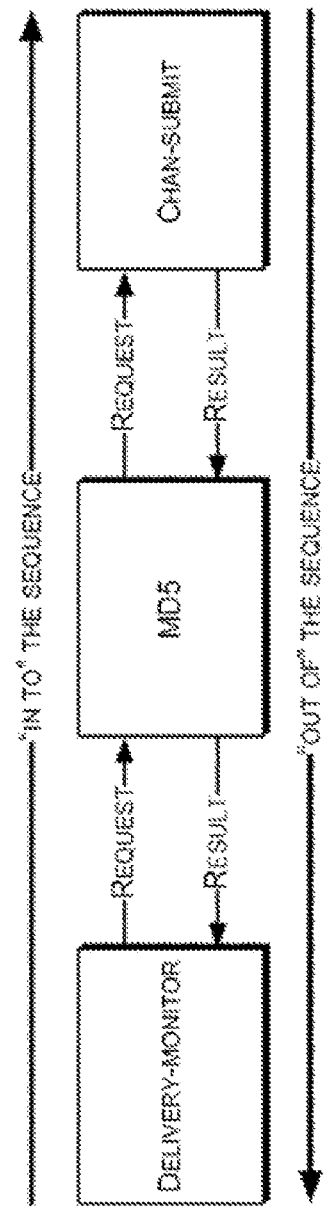

If the process requires other computations, the sequencer may be set up with additional handlers to perform those computations. In the example of FIG. 12B, the sequence further computes an MD5 hash of the data, and the sequencer is set up with an MD5 handler in the path. The MD5 handler can snoop the data as it passes (e.g., view the underlying bytes of payload) to compute the MD5 hash.

An example of a self-modifying sequence is shown in FIG. 12C. The MD5 handler sees the request on the way "in" to the sequence and inserts a new handler ("direct-to-buffered") handler to the "left" of the MD5 handler so that it runs before the MD5 handler. The "direct-to-buffered" handler translates direct delivery to buffered read/write, which may improve the performance of the MD5 computation.

A sequence can be modified to change direction of the order of operations. For example, in a case where direct delivery requests can be too large for a single buffered read/write, the "direct-to-buffered" handler can change the sequence direction to perform multiple operations on one side of the sequence (e.g., as shown in FIG. 12D). Handlers to the left of the "direct-to-buffered" handler still see what they expect to see (e.g., a single buffered read/write), while handlers to the right of the "direct-to-buffered" handler perform multiple operations.

Scripts and Customer-Specific Control

As noted, the request/response mechanism 904 (FIG. 9) may perform customer-specific processing as part of the request/response processing. The request/response mechanism needs certain customer-specific data 909 in order to perform the customer-specific processing.

The request/response mechanism 904 may allow customer-specific handlers (or sequences) to be included at various locations (or hooks) during request/response processing. These customer-specific handlers may perform operations on the request and/or response paths. The customer-specific scripts that are to be used to process a customer's requests are referred to as Customer Configuration Scripts (CCSs), and are associated with the customers, e.g., via customer ids. The system may also have a default mode in which it will perform request/response processing without any customer-specific handlers. That is, in some embodiments, customer-specific handlers are optional. In some embodiments, the default request/response processing is also specified using a default script in a format that is substantially the same as the format of a CCS.

It should be appreciated that scripts are not the same as sequences. A script is used to specify the sequences to be used to handle requests for a particular customer. The script may perform whatever operations it needs (including making its own HTTP requests, etc.) to determine what the sequences should be. For example, a script may also use a different sequence depending on the local environment. However, once the script has done that job, the resulting sequences (which may be referred to as the compiled form of the customer-specific sequence) are used (without rerunning the script) until something happens (e.g., the script is invalidated and reloaded) which indicates different sequences are now needed. Note, however, that a given handler may be implemented as a request/response script in the same language as the configuration script, but performing a different job.

Customers may provide handlers, parameters for existing handlers, or routines to be invoked by handlers at certain stages of the processing.

It should be appreciated that because, as noted, the client 903 may itself be another component of the CDN (e.g., a cache or a control core, etc.), the CDN itself may have CCSs associated therewith. That is, from the point of view of request/response processing, the CDN may be considered to be a customer of itself.

With reference again to FIG. 9, the server 902 will use the CCS for the customer associated with the request from the client 903. The CCS is stored in the database 907, in the customer-specific data 909. If the server does not have that customer's CCS stored locally at the time it is processing the client's request, the server 902 will attempt to obtain the CCS from another data source 910, typically from a control core 916. If a CCS is found, any customer-specific handlers (or sequences) specified in the CCS will be included in the appropriate locations (hooks) during request/response processing. In summary, the CCS generally is run once. It sets up the customer-specific sequences, which are then cached in their compiled form. If those sequences are present and valid, they are used without re-running the CCS.

Deploying Sequences of Handlers

Sequences of handlers may be authored by a system designer or software developer for deployment on hardware. As noted above, these sequences may be specified in a customer configuration script (CCS) for specifying customer-specific sequences of handlers and/or specified by a general configuration script to specify general sequences that are applied to requests that are not associated with particular customer-specific sequences. These configuration scripts define particular sequences of handlers to be executed in response to various events, and these scripts may, optionally, include handler arguments (e.g., strings), where the behavior of a given handler may be configured or modified based on the values of its corresponding handler arguments, as specified in the script. Different incoming requests may be processed by different configured sequences in accordance with information contained in the request (e.g., whether a domain name in a requested URI is associated with a particular customer or other metadata associated with the request).

As noted above, a request/response mechanism 904 may be implemented by software in combination with hardware on a server 902. In more detail, the hardware of the server generally includes a processor and memory storing program instructions that, when executed by the processor, cause the processor to perform various processing steps on data stored in the memory to implement the request/response mechanism 904. The context in which the request/response mechanism 904 runs (including, but not limited to, the software infrastructure implementing the request/response mechanism 904, the software libraries available to the software infrastructure, the capabilities of the hardware of the server 902 executing the software, and the location of the server 902 and/or the location of the request/response mechanism 904 within the CDN 100, such as its tier within a hierarchy of caches or its geographic location within the CDN 100) may be referred to as an execution environment.

When setting up a sequence in a request/response mechanism 904 on a server, sequencer infrastructure software (see, e.g., FIG. 13, described in more detail below) running in the execution environment provided by the server executes the configuration script, initializes the handlers specified by the configuration script based on the handler arguments (if any) in the configuration script, and generates an executable compiled sequence of initialized or configured handlers (e.g., a sequence object 1101) that is executed or run by the request/response mechanism 904 in response to incoming events or inputs. In general, a configuration script is executed only once by any given execution environment to initialize or compile a corresponding sequence of handlers, where the compiled sequence of handlers may be represented as a sequence object, and the compiled sequence of handlers is then executed numerous times (e.g., tens of thousands of times every second) to perform the specified pipeline of processing tasks on the incoming input and to generate outputs based on those inputs (e.g., in the case of a CDN, to respond to requests for particular content by generating responses containing the content, as well as updating logs or other statistical information).

Handlers may be configured to perform processing tasks on their inputs in order to implement the functionality specified by their application programming interfaces (APIs), e.g., as formally described by their preconditions and postconditions. Given that handlers may be executed tens of thousands of times every second, to improve performance, the process of generating an executable sequence of handlers from the configuration script may include generating an executable instance of the handlers that are included in the executable sequence, where the executable, configured instance of a given handler is configured based on the supplied handler arguments. For example, this compilation or initialization process may involve converting a human readable specification of the sequence of handlers and arguments in the configuration script into executable object code (e.g., compiled bytecode or machine code) that may be optimized for runtime efficiency. Furthermore, during execution, the compiled executable instances of handlers may allocate memory (e.g., in heap memory) or may make use of other storage that may be external to their threads and/or processes, such as storing data in databases (e.g., SQLite or PostgreSQL) and/or key-value stores (e.g., Memcached or Redis). Accordingly, in some circumstances, handlers are associated with various functions or entry points that manage the lifecycle of a handler, including initialization or creation of a handler (e.g., argument-create), cloning of an existing handler and/or its compiled arguments (e.g., argument-clone), a main entry point for providing the handler with an input to generate an output based on its API, a cleanup entry point that is called when all processing is done (e.g., to cleanup or remove data cached in various external data stores, especially in the case of non-standard exits such as when raising exceptions or errors), and a destroy entry point (e.g., argument-destroy) that is used to release memory allocated by the handler (e.g., data structures allocated in the heap portion of memory rather than stack portions of memory of a server).

The same configuration scripts may be deployed in multiple execution environments. For example, continuing the example of sequences running in a CDN, the same sequence of handlers may be deployed on different physical hardware or different virtual machines in different geographic areas to provide the same, or functionally equivalent, processing from the "best" or "optimal" server (e.g., the server that is geographically closest to the client making a request).

Different execution environments may offer different processing capabilities. For example, different execution environments may have different hardware functionality (e.g., having central processing units with different instruction sets and capable of different specialized functionality such as single-instruction-multiple-data or vector processing, specialized functions, and/or specialized processors such as graphics processing units and artificial intelligence accelerator units), software library availability (e.g., due to differences in available other software such as available versions of handlers, differences in versions of host environments such as the sequencer infrastructure software, differences in version of the underlying operating system and/or other software), and the like. Using configuration scripts to specify sequences of handlers in the form of their desired functionality, rather than in the form of particular implementations, allows different servers to generate compiled sequences (or sequence objects) that provide the same or similar functionality (or specified fallback functionality when the execution environment does not provide sufficient capabilities) in a manner that is efficient in their corresponding execution environments, despite differences in those execution environments.

In addition, the complexity of the processing tasks performed by various handlers may vary greatly. In some circumstances, handlers perform relatively simple processing tasks that do not perform side effects or allocate memory in the heap, but the generality of the API of a handler may require a significant amount of unnecessary functionality to be implemented (e.g., handler lifecycle management code) in order to match the execution model expected by the sequencer infrastructure.

Accordingly, aspects of embodiments of the present disclosure relate to systems and methods for configuring sequences of handlers, where the handlers specified in the configuration script may be compiled (or interpreted or executed) differently by the sequencer infrastructure, and/or may operate differently, based on the handler arguments provided to the handlers and/or based on the execution environment of the configured or complied sequences (e.g., based on the execution environment of the sequence object). In some embodiments, the processing steps performed by a handler may be implemented using an expression that is evaluated by the sequencer infrastructure instead of being implemented using the main entry point of a handler, thereby avoiding the need to implement unnecessary functionality, such as handler lifecycle management functionality (e.g., argument-destroy, argument-clone, and cleanup) and, in some cases, avoiding other overhead associated with executing a main entry point of a handler.

FIG. 13 is a schematic block diagram depicting sequencer infrastructure 1302 running on a server according to one embodiment of the present disclosure. The sequencer infrastructure 1302 may be operated as a component of the request/response mechanism 904 running on a server in a CDN. However, embodiments of the present disclosure are not limited thereto and may be applied to the configuration of other processing pipelines such as "middleware," "servlet filters," or "interceptors" in web application frameworks (e.g., Django, Flask, Java Servlets, ASP.NET, and the like), actors or kernel functions in stream processing frameworks or other software frameworks implementing processing sequences or pipelines of processing steps, where each processing step in the sequence performs a transformation of input data into output data and the output of an operation may be supplied as input to one or more other operations in the sequence or supplied as (part of) the output of the overall sequence. These processing steps may include, for example, the various examples described above (e.g., direct-to-buffered read/write, MD5 hashing, and logging) as well as other possible processing steps such as returning a connection channel from an input file descriptor and transforming content from one content encoding to another content encoding.

As shown in FIG. 13, the sequencer infrastructure 1302 includes a sequence compiler 1306 comprising a configuration script 1304 to generate a configured sequence or sequence object 1308 based on that configuration script. As mentioned above, the configuration script 1304 may specify a sequence of handlers (through corresponding handler identifiers such as names of handlers) or processing steps to be performed by a configured sequence (e.g., a configured sequence object), and the configuration script 1304 may further specify, for each of the handlers, zero or more handler arguments for configuring their corresponding handler (e.g., each handler may be configured with zero or more handler arguments that influence the behavior of the configured handler (e.g., initialized handler or compiled handler) that is included in the compiled sequence). In some embodiments, in a case where a handler is configured with zero handler arguments, the handler may be referred to as being configured by a null argument. As such, in some embodiments, a handler is configured using one or more handler arguments or a null argument.

FIG. 14 is a flowchart depicting a method for initializing a sequence based on an input configuration script according to one embodiment of the present disclosure. In some embodiments, the operations described in FIG. 14 are performed by the sequence compiler 1306 executed by the sequencer infrastructure software 1302. In more detail, in operation 1402, the sequencer infrastructure software 1302 receives a configuration script 1304 as input. As described above, the configuration script may be a customer configuration script that is used to configure a sequence object that processes inputs (e.g., requests) associated with a particular customer or may be a general or generic configuration script that defines a sequence for use on all requests not associated with a particular customer. In some embodiments, the sequence infrastructure software 1302 executes the sequence compiler 1306 by interpreting or otherwise executing the configuration script 1304 (e.g., the configuration script 1304 specifies operations to be performed in generating a sequence object, as described in more detail below). In other embodiments, the sequence compiler 1306 is implemented as a runtime within the sequencer infrastructure software 1302 where the runtime takes a text-based representation of a sequence (e.g., an embodiment of the configuration script 1304) to generate the sequence object.

In operation 1404, the sequence compiler 1306 initializes the one or more handlers of the sequence specified in the configuration script to generate one or more configured handlers of the sequence. In more detail, the configuration script 1304 may include one or more handler identifiers (e.g., strings) that identify particular uninitialized or unconfigured handlers. The uninitialized or unconfigured handlers, in turn, may be stored in a handler registry 1310 of the sequencer infrastructure. In some embodiments, the handlers available to the sequence compiler 1306 is limited to the collection of handlers stored in the handler registry 1310, which may be distributed together with the sequencer infrastructure 1302. That is, any particular version of the sequencer infrastructure 1302 may be bundled and distributed with a corresponding collection of particular handlers in the handler registry 1310, where the collection of handlers in the handler registry 1310 is updated together with the sequencer infrastructure (e.g., the handlers may be statically linked with the object code of the sequencer infrastructure 1302).

In some embodiments of the present disclosure, additional handlers or replacement collections of handlers may be independently deployed into the sequencer infrastructure 1302 (e.g., new and/or upgrades to existing handlers may be dynamically linked to the sequencer infrastructure 1302 and/or may be deployed in the form of source code or byte code that may be dynamically compiled, interpreted, and/or executed by the sequence compiler 1306 and/or other components of the sequencer infrastructure 1302, where the newly deployed handlers may be added to the handler registry 1310). For example, new handlers or updates to handlers may be retrieved from a remote source over a network (e.g., downloaded over the internet from another server or remote registry or repository of handlers).

In some embodiments, each of the handlers may be initialized by invoking an argument-create entry point (as described above) of the associated handler with the corresponding handler arguments (if any) that are specified in the configuration script 1304. For example, in an object-oriented programming model, the uninitialized or unconfigured handlers may be stored as code representing a class of objects implementing a more general handler API or handler interface (e.g., any particular uninitialized or unconfigured handlers may be a subclass of a more general handler class). As another example, the handlers may be stored in the handler registry 1310 as executable constructor functions that return an initialized or compiled handler in response to being invoked by the sequence compiler 1306. In some embodiments, an argument-create entry point (or other handler initialization entry point) inspects its arguments and may determine that it does not recognize some of those arguments or otherwise determine that it may be out of date. In such circumstances, in some embodiments, the argument-create entry point and/or the sequencer infrastructure checks a remote source (e.g., a central authority) to determine if a newer version of the handler is available that can recognize those arguments. If so, then the sequencer infrastructure 1302 retrieves a new version of the handler (e.g., from the remote source over a network) and configures the retrieved new version of the handler for use in the compiled sequence (e.g., the sequence object).

In operation 1406, the sequence compiler generates or constructs a compiled sequence or compiled sequence object based on the configured handlers that were initialized in operation 1404. For example, in some embodiments, the sequence compiler adds the configured handlers to a sequence object. This complied sequence or compiled sequence object 1308 may then be used by a sequencer 1312 (e.g., to implement the request/response mechanism 904) to handle the processing of inputs to the sequence, such as processing requests 1314 and generating responses 1316 (e.g., in a manner similar to that described above with respect to FIGS. 11A-11D and FIGS. 12A-12D.

FIG. 15 is a flowchart depicting a method for initializing a handler based on handler arguments according to one embodiment of the present disclosure. In some embodiments, the sequence compiler 1306 performs the operations described with respect to FIG. 15, or equivalents thereof, for each handler of the sequence to be initialized in operation 1404 of FIG. 14. In operation 1502, the sequence compiler 1306 parses the handler arguments associated with or corresponding to the handler being initialized. The parsing may include, for example, converting string representations of handler arguments into corresponding values (e.g., convert-ing strings to integers or converting data representing multiple fields into a record or product-type data structure). In operation 1504, the sequence compiler 1306 selects a handler identified by the handler identifier that was specified by the configuration script. For example, a handler identifier for an MD5 handler may be the string "MD5_Handler" and a handler identifier for a direct-to-buffered handler may be the string "Direct-to-Buffered_Handler." The handler registry 1310 may store a mapping from handler identifiers to uninitialized handlers (e.g., as a lookup table). In operation 1506, the sequence compiler invokes a handler initialization entry point (e.g., argument-create entry point) of the uninitialized handler with the handler arguments (if any) parsed in operation 1502, which returns a configured handler. The executable, configured handler may then be inserted into the compiled sequence or sequence object 1308 in operation 1406.

In some embodiments, the handler initialization entry point of an uninitialized handler may return different types of configured handlers based on the context, such as based on the handler arguments and/or based on parameters of an execution environment of the sequencer 1312. For example, in some embodiments, the handler initialization entry point returns an expression (in an expression language, such as a domain-specific language for representing processing tasks) instead of a full handler, where the expression may be evaluated by an expression interpreter or expression runtime of the sequencer 1312 and implements functionality consistent with the pre-conditions and post-conditions of the handler. In some embodiments, when invoked, the handler initialization entry point selects between different potential representations of a configured handler, each of which implements functionality consistent with the pre-conditions and post-conditions of the handler, where those different potential representations include two or more of: a configured instance of the handler, a configured alternate handler different from the original handler, a sequence of handlers, or an expression (e.g., written in an expression language). For the sake of clarity, as used herein, a "handler" may refer to an object that implements functionality consistent with pre-conditions and post-conditions specified in a sequence, a "full handler" refers to an implementation of a handler that includes implementations of the handler lifecycle management entry points as described above (e.g., argument-destroy, cleanup, etc.) whereas an "expression handler" implements the functionality of a handler using an expression, without implementations of the full lifecycle management entry points.

In some embodiments, implementing the functionality of a handler using an expression provides efficiency improvements over a full handler, but may also have reduced flexibility, in accordance with the capabilities and limitations of the expression language. For example, the expression to be evaluated may take various input arguments satisfying the preconditions of the handler (e.g., corresponding to an incoming request when processing requests on the way "in to" the sequence) and evaluate to values that satisfy the postconditions of the handler (e.g., corresponding to the processed requests output by the handler on the way "out of" the sequence).

As one example, an expression language may support data types such as Booleans, strings, floating point numbers, signed integers, unsigned integers, and records (e.g., a combination of values as a product-type, where each value in the record may be stored in a particular "field" of the record and associated with a field name, and records may be stored within fields, thereby resulting in hierarchical treelike data structures) and may provide functionality such as string manipulation (e.g. string concatenation), arithmetic (e.g., addition, subtraction, multiplication, division, modulus, left and right shifts, bitwise AND, OR, and complement, Boolean operators, a conditional operator (e.g., if <e> then <a1> else <a2>), grouping via parentheses, and comparisons against lists of values (e.g., testing for membership of a value within a list of values). An expression language may also allow the setting of particular fields of an argument (e.g., where the expression takes an input record and returns an output record with one or more fields set to specified or computed values). For example, in some embodiments, the expression language is used to set values in the objects associated with a request or a response, such as the Notes Object 1004, a Session Object 1006, and a Transaction Object 1008.

Accordingly, expression handlers according to some embodiments may be implemented as an expression using an expression language to perform various processing steps on a request on its way "in to" a sequence or on a response on its way "out of" a sequence (or other types of data passing through a data processing pipeline). In particular, in some embodiments, the sequencer 1312 uses an expression runtime environment or expression evaluator to evaluate any expressions in the sequence object given the current input to the expression (e.g., given a current incoming request or outgoing response) to compute a value that is consistent with the postconditions of the handler.

As such, a software developer implementing the functionality of a handler using an expression according to some embodiments of the present disclosure does not need to implement a lifecycle management functionality of a full handler (e.g., argument-destroy, argument-clone, and cleanup), because this functionality is not needed when invoking an expression using an expression runtime. In such cases, the sequencer may also avoid overhead associated with managing the lifecycle of a handler as well as, in some cases, avoid overhead associated with executing a main entry point of a handler (e.g., a function call overhead).

While implementing the functionality of a handler using an expression generally saves software development time and reduces the overhead in executing sequences, full handlers may still be used in circumstances involving more complex processing. For example, a more elaborate or featureful programming language may be better suited for performing complex processing steps. In addition, in some embodiments, the expression language may be constrained such that the expression runtime does not produce side effects that mutate or modify data other than the request or response being processed by the handler, and a full handler may be necessary to implement operations that affect other data (e.g., mutations or modifications to other data outside of the request or response returned by the handler, such as updating logs, modifying values in databases, and the like).

In some embodiments, the sequence compiler 1306 retrieves an uninitialized handler from a handler registry 1310 based on a handler identifier, where the collection of uninitialized handlers in the handler registry 1310 is distributed with the sequencer infrastructure 1302 and is fixed during the lifetime of the sequencer infrastructure 1302. For example, in these embodiments, the collection of handlers in the handler registry 1310 is upgraded or updated only when the sequencer infrastructure 1302 is updated. In such circumstances, it is possible to ensure that the collection of uninitialized handlers distributed with a sequencer infrastructure 1302 are all compatible with the sequencer infrastructure (e.g., it would be possible to ensure that handlers do not include calls to invoke library functions that are not available in the particular version of the sequencer infrastructure 1302 that the handlers are deployed with).

Nevertheless, due to the wide range of possible execution environments, it is possible that handlers may attempt to use functionality that is not available in their particular execution environments. This may occur, in examples, when the handlers are distributed separately from the infrastructure in which the handler is running (e.g., when they are dynamic handlers). As a nonexclusive example, a handler that is intended as an expression handler but is deployed in an environment where either the sequencer does not know how to run expressions or where there is a problem with the expression implementation, the handler may become a full handler and implement the expression itself (possibly less efficiently). In addition, in some circumstances, it may be necessary to deploy new versions of handlers with older versions of sequencer infrastructure software, such as to deploy bug fixes to handlers but where the sequencer infrastructure may need to stay on an older version because it is running on an older server (e.g., a legacy or older version of an operating system or on legacy hardware). Furthermore, in some embodiments, the handler registry 1310 may be dynamically updated during normal operation with new handlers or new versions of handlers, independent of the deployment of a new version of the sequencer infrastructure 1302 (e.g., the sequence compiler 1306 and/or the sequencer 1312), such as the case where new handlers may be dynamically linked or deployed as source code to be interpreted (e.g., expressions written in the expression language).

Accordingly, some aspects of embodiments of the present disclosure relate to uninitialized handlers that dynamically return different types of configured handlers when the sequence compiler 1306 invokes the handler initialization entry point, where the type of configured handler is determined by the handler (e.g., by logic in the argument-create entry point) based on the handler arguments and/or parameters of the execution environment.

FIG. 16 is a flowchart depicting a method for selecting a type of handler and initializing the selected type of handler based on handler arguments and/or parameters of an execution environment according to one embodiment of the present disclosure. The parameters of an execution environment of the sequencer 1312 may include the sequencer infrastructure 1302 (e.g., the version of the sequencer infrastructure), the expression language runtime in the sequencer infrastructure 1302, the software libraries available to the sequencer infrastructure 1302 (e.g., dynamically linkable libraries installed on the server), the handlers available in the handler registry 1310 and the version numbers thereof, the capabilities of the hardware of the server 902 executing the sequencer 1312 (e.g., advanced processor instructions, co-processors such as GPUs and ASICs, specialized memory modules such as high bandwidth memory, and the like), and the location of the server 902 and/or the location of the request/response mechanism 904 within the CDN 100, such as its tier within a hierarchy of caches or its geographic location within the CDN 100.

In operation 1602, a handler result type is determined based on the handler arguments in accordance with the invocation of the handler initialization entry point and/or parameters of the execution environment. In examples, the determination of a handler result type may be based on information the sequence compiler 1306 receives when it runs the handler's argument-create or other initialization entry point. In more detail, and in examples, the handler initialization entry point (e.g., "argument-create" function) takes, as input, the handler arguments and includes logic for determining what type of handler to return, based on those handler arguments and/or parameters describing the execution environment of the sequencer infrastructure 1302. In the embodiment shown in FIG. 16, the handler initialization entry point includes logic for selecting between four different types of configured handlers and, based on the selection, the sequence compiler 1306 initializes an instance of a configured handler based on the type of handler selected in operation 1602. In particular, in operation 1604, the sequence compiler 1306 initializes a full handler (with its associated lifecycle management entry points and "main" entry point); in operation 1606, the sequence compiler 1306 initializes an expression implementing the functionality of the handler; in operation 1608, the sequence compiler 1306 initializes an alternate or alternative handler; in operation 1610, the sequence compiler 1306 initializes an alternative sequence of handlers; and in operation 1612, the sequence compiler 1306 initializes a no-op handler (e.g., a handler that performs no operation on its input and outputs the same value that it received as input, which may also be referred to as an identity function).

In these embodiments, the determination of which type of handler to return depends on characteristics of the processing step or task being performed by the handler, as specified by the handler arguments supplied in the configuration script and/or based on parameters of the execution environment. For example, in some embodiments, the sequence compiler 1306 invoking the handler initialization entry point may determine that the processing step of the handler, as configured based on the handler arguments, may be performed using an expression, and therefore the handler initialization entry point returns an initialized instance of an expression (in accordance with the handler arguments) as the configured handler in accordance with operation 1606 of FIG. 16.

As another example, the sequence compiler 1306 may determine that the processing step to be performed by the handler, as configured based on the handler arguments, is more efficiently performed using a configured instance of the handler itself, and therefore initializes and generates a configured instance of the handler in accordance with operation 1604 of FIG. 16. The sequence compiler 1306 may also make this selection in cases where the sequence compiler 1306 determines, based on parameters the execution environment, that the expression runtime (or another aspect of the sequencer infrastructure 1302) lacks the necessary functionality for implementing the handler using an expression. For example, the sequencer infrastructure may lack an expression runtime entirely or the expression may use language features that are not supported by the expression runtime that is running in the version of the sequencer 1312 that will execute the sequence object 1308.

Similarly, in some embodiments, the sequence compiler 1306 may determine that the particular specified handler may not be available in the handler registry 1310, may be incompatible with the sequencer 1312, or may otherwise be inappropriate for use based on the specified handler arguments and/or parameters of the execution environment. In such a case, the sequence compiler 1306 may initialize an alternate handler (e.g., a fallback handler) in accordance with operation 1608 of FIG. 16 or an alternate sequence of handlers (e.g., a fallback subsequence of handlers) in accordance with operation 1610 of FIG. 16.

The fallback alternate handler or fallback subsequence of handlers may implement a no-op handler in circumstances where the processing step is optional or may have similar, but reduced, functionality, may have different performance characteristics (e.g., performs the same transformation of the request or response, but at higher computational cost).

For example, a new version of a sequencer infrastructure 1302 may provide a new handler that performs multiple operations together, whereas previous versions of the sequencer architecture 1302 provided separate handlers for each of those operations, and where the new single handler performs the operations more efficiently (e.g., more quickly) than the multiple separate handlers. In this case, the sequence infrastructure uses the more efficient combined handler when it is available in the execution environment (e.g., in the handler registry 1310), and falls back to the equivalent, but slower, technique using multiple handlers when running in an execution environment that does not have access to the new handler.

In some embodiments, the sequence compiler 1306 invoking the handler initialization entry point may cause the sequence compiler 1306 to be instructed, based on the handler arguments, that no processing by the handler is necessary in the configured sequence. Accordingly, in some embodiments, when the handler is unnecessary, the compiled sequence omits the unnecessary handler, where the input (e.g., request or response) that would have been provided to the handler, if it were present, is provided directly to the next handler in the sequence (e.g., as if the handler that was determined to be unnecessary was never a part of the sequence). In other embodiments, the handler initialization entry point returns an initialized no-op handler in accordance with operation 1612 of FIG. 16 that performs the identity function on its input (e.g., that outputs the same request or response that it received as input) or where the no-op handler is disregarded by the sequencer infrastructure 1302 when executing the sequence object. In some embodiments, when generating or constructing the complied sequence in operation 1406, the sequence compiler omits all no-op handlers, such that requests and responses are provided directly to the next handler in the sequence.

As noted above, in some embodiments of the present disclosure the handlers operate in two directions and process inputs (e.g., requests) in a first direction on the way "in to" the sequence as well as outputs (e.g., responses) in a second direction coming "out of" the sequence, as shown in FIGS. 12A-12D. In some such embodiments with handlers processing data in multiple directions, the process of configuring a handler as described above may result in different types of handlers being configured for each of the different directions (e.g. the "in to" and "out of" paths). For example, during the initialization of a handler in operation 1506, the handler initialization entry point may use an expression handler for the "in to" path and perform no operation (e.g., a no-op handler or skipped over entirely) on the "out of" path when initializing one handler of a sequence. As another example, the handler initialization entry point may use an alternate handler for the "in to" path and an expression handler on the "out of" path when initializing another handler of the sequence.

While FIG. 16 and the associated description illustrate embodiments in which the handler may be initialized as any of: a full handler; an expression; an alternate handler; or an alternate sequence of handlers, embodiments of the present disclosure are not limited thereto and the handler initialization entry point may determine between any two of the above example types of handlers. In addition, the types of possible handlers is not limited to the above four examples, but may also include other types of handlers (e.g., handlers that are consistent with the API specified by the handler, such as the preconditions and postconditions associated with the processing step implemented by the handler).

Accordingly, the compiled sequence or sequence object 1308 may include handlers that are configured as described above, e.g., where any given configured handler of the compiled sequence may be implemented as a full handler, an expression, an alternate handler, an alternate subsequence of handlers, or no operation at all (e.g., omitting the handler from the compiled sequence or including a configured no-op handler in the sequence). The sequencer 1312 performs processing tasks on inputs (e.g., requests 1314) and may generate outputs (e.g., responses 1316) by supplying the inputs to a sequence object 1308 corresponding to that request, such as a customer-specific sequence object or a general sequence object. When executing a compiled sequence or sequence object that includes both expression handlers and full handlers (or subsequences of handlers), the sequencer 1312 may detect whether the current handler to be executed in the configured sequence is an expression handler. If so, then the sequencer 1312 evaluates the expression with the given input (e.g., a request that was provided as input into the handler) to generate an output. If the current handler is not an expression handler, then standard techniques for invoking a handler in accordance with its API may be used instead (e.g., invoking the main entry point of the configured handler). In various embodiments, the expression may be represented as a string (e.g., uncompiled code) and interpreted by the expression runtime or may be represented as compiled native code or compiled bytecode, where the compilation of the expression may be performed before deployment to the server, during the handler initialization, or just-in-time (JIT) by the expression runtime during or after the first time the expression handler is executed.

As such, aspects of embodiments of the present disclosure provide additional flexibility in the implementations of handlers in processing pipelines, including adaptability based on capabilities of execution environments of the handlers and reduced code (e.g., boilerplate) for handling operations that may be expressed more compactly and executed more efficiently using an expression language.

Figure 17:
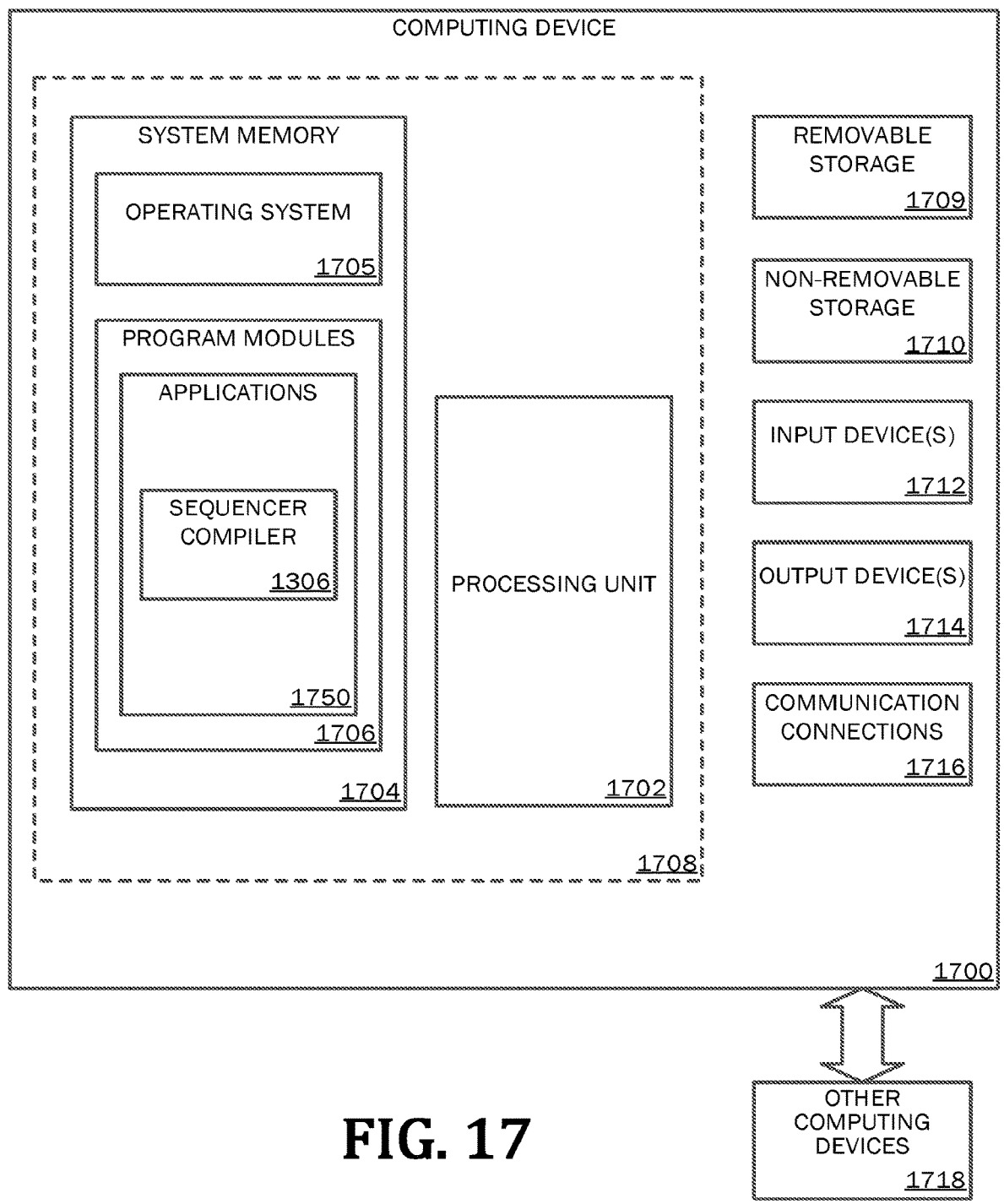
FIG. 17 depicts an example operating environment in which aspects of the present disclosure may be practiced.

FIG. 17 and the associated description provides a discussion of a variety of operating environments in which examples of the invention may be practiced. However, the devices and systems illustrated and discussed with respect to FIG. 17 are for purposes of example and illustration and are not limiting of a vast number of computing device configurations that may be utilized for practicing aspects of the invention, described herein.

Computing device 1700 is an example computing environment with which examples of the present disclosure may be practiced. The computing device components described below may be suitable for a server operating the sequencer compiler 1306 described above. In a basic configuration, the computing device 1700 may include at least one processing unit 1702 and a system memory 1704. The processing unit(s) (e.g., processor(s)) may also be referred to as a processing system. Depending on the configuration and type of computing device, the system memory 1704 may comprise, but is not limited to, volatile storage (e.g., random access memory), non-volatile storage (e.g., read-only memory), flash memory, or any combination of such memories. The system memory 1704 may include an operating system 1705 and one or more program modules 1706 suitable for running software applications 1750 such as a sequencer compiler 1306.

The operating system 1705, for example, may be suitable for controlling the operation of the computing device 1700. Furthermore, aspects of the invention may be practiced in conjunction with a graphics library, other operating systems, or any other application program and is not limited to any particular application or system. This basic configuration is illustrated in FIG. 17 by those components within a dashed line 1708. The computing device 1700 may have additional features or functionality. For example, the computing device 1700 may also include additional data storage devices (removable and/or non-removable) such as, for example, magnetic disks, optical disks, or tape. Such additional storage is illustrated in FIG. 17 by a removable storage device 1709 and a non-removable storage device 1710.

As stated above, a number of program modules and data files may be stored in the system memory 1704. While executing on the processing unit 1702, the program modules 1706 may perform processes including, but not limited to, one or more of the operations of the methods discussed herein. Other program modules that may be used in accordance with examples of the present invention.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 17 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 1700 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 1700 may also have one or more input device(s) 1712 such as a keyboard, a mouse, a pen, a sound input device, a touch input device, etc. The output device(s) 1714 such as a display, speakers, a printer, etc. may also be included. The aforementioned devices are examples and others may be used. The computing device 1700 may include one or more communication connections 1716 allowing communications with other computing devices 1718. Examples of suitable communication connections 1716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1704, the removable storage device 1709, and the non-removable storage device 1710 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1700. Any such computer storage media may be part of the computing device 1700. Computer storage media may be tangible and non-transitory and does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

What is claimed is:

1. A method for registering a handler, by a processor, in a configured sequence of handlers, the method comprising:
   receiving, by the processor and memory storing instructions implementing a sequencer infrastructure, a configuration script defining a sequence comprising one or more handler identifiers and corresponding one or more handler arguments;
   invoking, by the processor, a handler initialization entry point for a handler corresponding to a handler identifier of the one or more handler identifiers, the invoking the handler initialization entry point comprising:
   selecting, by the processor and based on the corresponding one or more handler arguments, a handler type, and
   initializing, by the processor, a configured handler based on the handler type selected and the corresponding one or more handler arguments;
   adding, by the processor, the configured handler to a configured sequence of handlers; and
   executing, by a sequencer of the sequencer infrastructure, the configured sequence of handlers to generate an output in response to an input.

2. The method of claim 1, wherein the selecting the handler type is further based on a plurality of parameters of an execution environment of the sequencer.

3. The method of claim 2, wherein the parameters of the execution environment comprise:
   a version number of the sequencer infrastructure;
   a handler registry of handlers available to the sequencer infrastructure;
   a plurality version numbers of corresponding ones of the handlers of the handler registry;
   descriptions of hardware capabilities of a server comprising the processor and memory and configured to execute the sequencer; or
   a location of the server.

4. The method of claim 2, wherein the invoking the handler initialization entry point further comprises dynamically registering the handler with the execution environment.

5. The method of claim 4, wherein the handler is retrieved from a remote source over a network.

6. The method of claim 1, wherein the sequencer executing the configured sequence of handlers processes requests and generates responses in a content delivery network.

7. The method of claim 1, wherein the sequencer executing the configured sequence of handlers processes requests and generates responses in a web application server.

8. The method of claim 1, wherein the sequencer processes input data in a stream processing pipeline corresponding to the configured sequence of handlers.

9. The method of claim 1, further comprising omitting the configured handler from the configured sequence of handlers when the handler type is the no-op handler.

10. A computing system comprising:
    at least one processor; and
    memory storing instructions that, when executed by the at least one processor, cause the system to:
    register a handler in a configured sequence of handlers by:
    receiving a configuration script defining a sequence comprising one or more handler identifiers and corresponding one or more handler arguments;
    invoking a handler initialization entry point for a handler corresponding to a handler identifier of the one or more handler identifiers, the invoking the handler initialization entry point comprising:
    selecting, based on the corresponding one or more handler arguments, a handler type, and
    initializing a configured handler based on the handler type selected and the corresponding one or more handler arguments; and
    adding, by the processor, the configured handler to a configured sequence of handlers; and
    implement a sequencer infrastructure configured to execute the configured sequence of handlers to generate an output in response to an input.

11. The computing system of claim 10, wherein the selecting the handler type is further based on a plurality of parameters of an execution environment of the sequencer.

12. The computing system of claim 11, wherein the parameters of the execution environment comprise:
- a version number of the sequencer infrastructure;
- a handler registry of handlers available to the sequencer infrastructure;
- a plurality version numbers of corresponding ones of the handlers of the handler registry;
- descriptions of hardware capabilities of a server comprising the processor and memory and configured to execute the sequencer; or
- a location of the server.

13. The computing system of claim 11, wherein the invoking the handler initialization entry point further comprises dynamically registering the handler with the execution environment.

14. The computing system of claim 13, wherein the handler is retrieved from a remote source over a network.

15. The computing system of claim 10, wherein the sequencer executing the configured sequence of handlers processes requests and generates responses in a content delivery network.

16. The computing system of claim 10, wherein the sequencer executing the configured sequence of handlers processes requests and generates responses in a web application server.

17. The computing system of claim 10, wherein the sequencer processes input data in a stream processing pipeline corresponding to the configured sequence of handlers.

18. The computing system of claim 10, wherein the memory further stores instructions that, when executed by the at least one processor, cause the system to omit the configured handler from the configured sequence of handlers when the handler type is the no-op handler.

19. A method, for registering a handler, by a processor, in a configured sequence of handlers, the method comprising:
- receiving, by the processor and memory storing instructions implementing a sequencer infrastructure, a configuration script defining a sequence comprising one or more handler identifiers and corresponding one or more handler arguments;
- invoking, by the processor, a handler initialization entry point for a handler corresponding to a handler identifier of the one or more handler identifiers, the invoking the handler initialization entry point comprising:
  - selecting, by the processor and based on the corresponding one or more handler arguments and a plurality of parameters of an execution environment of a sequencer, a handler type, and
  - initializing, by the processor, a configured handler based on the handler type selected and the corresponding one or more handler arguments;
- adding, by the processor, the configured handler to a configured sequence of handlers; and
- executing, by the sequencer of the sequencer infrastructure, the configured sequence of handlers to generate an output in response to an input.

20. The method of claim 19, wherein the invoking the handler initialization entry point further comprises dynamically registering the handler with the execution environment.

* * * * *